(12) United States Patent
Arbabian

(10) Patent No.: US 11,536,254 B2
(45) Date of Patent: Dec. 27, 2022

(54) SYSTEM FOR CONVERTING ROTATIONAL MOMENTUM INTO VERSATILE LINEAR PROPULSION

(71) Applicant: Morteza Arbabian, Madison, WI (US)

(72) Inventor: Morteza Arbabian, Madison, WI (US)

(*) Notice: Subject to any disclaimer, the term of this patent is extended or adjusted under 35 U.S.C. 154(b) by 830 days.

(21) Appl. No.: 16/509,352

(22) Filed: Jul. 11, 2019

(65) Prior Publication Data

US 2020/0277938 A1    Sep. 3, 2020

Related U.S. Application Data

(60) Provisional application No. 62/872,591, filed on Jul. 10, 2019, provisional application No. 62/697,171, filed on Jul. 12, 2018.

(51) Int. Cl.
*B64G 1/40* (2006.01)
*F03G 3/02* (2006.01)
*F03G 3/08* (2006.01)

(52) U.S. Cl.
CPC ............... *F03G 3/02* (2013.01); *F03G 3/08* (2013.01)

(58) Field of Classification Search
CPC .......... H02K 53/00; F16H 33/20; F03G 3/00; F03G 7/10; Y10T 74/18528; Y10T 74/18536; Y10T 74/18344; Y10T 74/2111; B64G 1/409
USPC .................................. 74/61, 84 S; 244/171.5
See application file for complete search history.

(56) References Cited

U.S. PATENT DOCUMENTS

| 3,968,700 | A | | 7/1976 | Cuff |
| 4,087,064 | A | | 5/1978 | Knap |
| 4,171,029 | A | | 10/1979 | Beale |
| 5,685,196 | A | | 11/1997 | Foster, Sr. |
| 5,782,134 | A | * | 7/1998 | Booden ................ F03G 3/00 74/61 |
| 5,831,354 | A | | 11/1998 | Stopplecamp |
| 7,008,276 | B1 | * | 3/2006 | Laul .................... B64C 29/0008 440/13 |

(Continued)

FOREIGN PATENT DOCUMENTS

DE    44 23 509 A1    3/1995

OTHER PUBLICATIONS

International Preliminary Report on Patentability in International Patent Application No. PCT/US2019/041443 dated Jan. 21, 2021.

(Continued)

*Primary Examiner* — Randell J Krug
(74) *Attorney, Agent, or Firm* — Foley & Lardner LLP

(57) ABSTRACT

Disclosed are systems for converting rotational momentum into linear propulsion. A propulsion system includes one or more thrust units with masses controllably driven by actuators to generate inertia that thrusts a vehicle with the propulsion system in a desired direction. The propulsion system can be configured to have multiple units, each configured to generate thrust in a desired direction and counteract or neutralize thrust in other directions. The propulsion system can generate thrust via two operational cycles and/or through continuous operation. The propulsion system may comprise two mirroring units, each configured to operate in mirrored synchrony to generate a net thrust in a desired direction and counteract or neutralize thrust in other or undesired directions.

14 Claims, 11 Drawing Sheets

(56) References Cited

U.S. PATENT DOCUMENTS

| | | |
|---|---|---|
| 2002/0121572 A1 | 9/2002 | Jacobson |
| 2002/0148308 A1* | 10/2002 | Rush ..................... B64G 1/409 |
| | | 74/84 S |
| 2008/0168862 A1 | 7/2008 | Walden |
| 2014/0285044 A1 | 9/2014 | Harouny |
| 2018/0009551 A1* | 1/2018 | Skowronski .............. F03G 3/00 |

OTHER PUBLICATIONS

International Search Report and Written Opinion in International Application No. PCT/US2019/041443 dated Oct. 28, 2019.

* cited by examiner

SYSTEM FOR CONVERTING ROTATIONAL MOMENTUM INTO VERSATILE LINEAR PROPULSION

CROSS-REFERENCE TO RELATED APPLICATIONS

This application claims priority to U.S. Provisional Patent Application No. 62/697,171 entitled "CLOSED PROPULSION THRUSTER," filed Jul. 12, 2018, and to U.S. Provisional Patent Application No. 62/872,591 entitled "CLOSED PROPULSION THRUSTER," filed Jul. 10, 2019, each of which is incorporated herein by reference in its entirety.

FIELD

The present application relates generally to propulsion systems, and more particularly to propulsion thrusters that may be used to propel a vehicle, object, or entity through three-dimensional space.

BACKGROUND

Propulsion thrusters, which may be alternatively referred to as propulsion systems, may be used individually or in groups to propel a vehicle, object, or entity through space. Travel through "space" may include outer space travel, aerial travel, ground travel, water travel, etc. Use of a closed propulsion system or thrusters allows for propulsion of an object or objects without the use of combustion mechanisms involving accelerated gas or working fluid.

SUMMARY

Various embodiments of the disclosure relate to a propulsion system. The propulsion system may comprise one or more thruster units. For example, the propulsion system may comprise first and second thruster units. The propulsion system may be a closed propulsion system that does not use, for example, accelerated gas or propellant. Each thruster unit may have a movable mass. The propulsion system may comprise one or more mechanical actuators. The one or more actuators may rotate each mass along a trajectory. The trajectory may have a circular segment and a non-circular segment. The trajectory may deviate from a circular trajectory. Deviation from the circular trajectory may result in each thruster unit generating a first (e.g., forward) momentum and a second (e.g., non-forward) momentum. The first thruster unit may be positioned with respect to the second thruster unit in the propulsion system such that the first (e.g., forward) momentums of the first and second thruster units are additive. The first thruster unit may be positioned with respect to the second thruster unit in the propulsion system such that the second (e.g., non-forward) momentums of the first and second thruster units are at least partially (if not entirely) neutralized.

In one or more embodiments, each thruster unit may be configured to generate the first momentum at a first segment of the trajectory of the corresponding mass. Each thruster unit may be configured to generate the second momentum at a second segment of the trajectory of the corresponding mass.

In one or more embodiments, the propulsion system may comprise one or more controllers that set and modify operational parameters (e.g., rotational speed, timing, etc.) for one or more thruster units (or components of thruster units) to achieve propulsion in desired directions in three dimensions. Operational parameters may be set and/or modified via control signals to one or more actuators.

In one or more embodiments, the system may comprise a controller configured to control the one or more actuators. The controller may control actuators to set rotational speed for one or both of the masses of the first and second thruster units.

In one or more embodiments, the controller may be configured to change rotational speeds of the masses to change magnitudes of the first momentums.

In one or more embodiments, each thruster unit may comprise a rotating arm. The arm may be secured to the corresponding mass. The rotating arm may be configured to change its length as it rotates. The length may be changed corresponding with segments of the trajectory of the rotating mass. The length of the rotating arm may be changed by a controller of the propulsion system.

In one or more embodiments, the rotating arm may have a first length at a circular segment of the trajectory. The rotating arm may have a second length at a deviating segment of the trajectory. The second length may be greater than the first length.

In one or more embodiments, each of the first and second thruster units may comprise a track. The corresponding masses may move within the track. Each thruster unit may reciprocate the mass within the corresponding track. The thruster units may reciprocate the masses using one or more mechanical actuators. The masses may be reciprocated between end regions of corresponding tracks.

In one or more embodiments, each thruster unit may be configured to generate the first momentum via collision of the mass at a first end region of the track. Each thruster unit may be configured to generate the second momentum via collision of the mass at a second end region of the track.

In one or more embodiments, the propulsion system may comprise one or more sensors. The one or more sensors may be used to determine a state of the thruster units or components of the thruster units. The propulsion system may be configured to determine, for example, rotational speed of the masses of the first and second units based on data from the one or more sensors. The propulsion system may, alternatively or additionally, be configured to determine, for example, positions of the masses of the first and second thruster units based on data from the one or more sensors.

In one or more embodiments, the propulsion system may comprise a controller configured to determine rotational speed based on data from the one or more sensors. The propulsion system may comprise a controller that is configured to determine positions of the masses of the first and second thruster units based on data from the one or more sensors.

In one or more embodiments, the propulsion system may comprise a controller that is configured to control one or more mechanical actuators to, for example, increase and/or decrease rotational speeds.

In one or more embodiments, the propulsion system may comprise a controller that is configured to control one or more mechanical actuators to, for example, change relative positions of the masses in corresponding trajectories.

In one or more embodiments, the thruster units may be configured such that the masses rotate in a same spatial plane.

In one or more embodiments, the first and second thruster units may be configured to be tiltable such that the masses are rotatable in variable planes.

In one or more embodiments, thruster units may be configured such that the masses rotate in different spatial planes.

In one or more embodiments, the propulsion system is, or is part of, a vehicle. The vehicle may comprise any number of propulsion systems. The vehicle may be any combination of, or have capabilities of any combination of, spacecraft, aircraft, watercraft, and/or land vehicles.

In one or more embodiments, the propulsion system is a closed system of converting rotational momentum into linear propulsion.

In one or more embodiments, two linear propulsions are generated per rotation. Two linear propulsions may be generated per rotation of each thruster unit.

Various embodiments of the disclosure relate to a propulsion system that may comprise one or more thruster units. For example, the propulsion system may comprise first and second thruster units. Each thruster unit may have a closed track. Each thruster unit may comprise one or more actuators. The actuators may be configured to move a mass within the track. Each track may include a circular segment and a deviating segment. The circular segment may correspond with a circle, and the deviating segment may deviate from the circle. Each thruster unit may generate a first (e.g., forward) momentum and a second (e.g., non-forward) momentum. Momentums may be generated as the mass moves through the track. The first and second thruster units may have a mirroring configuration. The mirroring configuration may result in first (e.g., forward) momentums of the first and second thruster units being additive. The mirroring configuration may result in second (e.g., non-forward) momentums of the first and second units being at least partially neutralized.

In one or more embodiments, one or more actuators of each thruster unit may be situated at terminal ends of the track. The actuators may be configured to reciprocate the mass between the terminal ends.

In one or more embodiments, thruster units (e.g., the first and second thruster units) may be situated such that the masses move within a same spatial plane.

In one or more embodiments, two or more thruster units may be situated such that the masses move within different spatial planes in three dimensions.

In one or more embodiments, the first and second thruster units may move the corresponding mass from a first end region to a second end region of the corresponding track in a first cycle. The first and second thruster units may move the corresponding mass from the second end region to the first end region in a second cycle. The propulsion system may comprise a controller configured to control the one or more actuators to set timing for the first and second cycles.

Various embodiments of the disclosure relate to a method of propulsion. The method may comprise moving a first mass of a first thruster unit along a first trajectory. The first trajectory may include a first circular segment and a first deviating segment. The first mass may be moved to generate a first forward momentum and a first non-forward momentum. The first forward and non-forward momentums may be generated as the first mass rotates. The method may comprise moving a second mass of a second thruster unit. The second mass of the second thruster unit may be moved simultaneously. That is, the first and second masses may be moved at the same time. The second mass may be moved along a second trajectory. The second trajectory may include a second circular segment and a second deviating segment. The second mass may be moved to generate a second forward momentum and a second non-forward momentum. The second forward and non-forward momentums may be generated as the second mass rotates. The second thruster unit may be positioned with respect to the first thruster unit such that the first and second forward momentums are additive. The second thruster unit may be positioned with respect to the first thruster unit such that at least one of the first and second non-forward momentums is at least partially neutralized by the other of the first and second non-forward momentums.

In one or more embodiments, the first mass may be rotated at a first rotation speed and the second mass may be rotated at a second rotation speed. The first forward momentum may have a first forward magnitude and the second forward momentum may have a second forward magnitude. The method may comprise changing one or both of the first and second rotation speeds to change one or both of the first and second forward momentums.

In one or more embodiments, moving the first mass along the first trajectory may comprise changing a first length of a first telescopic arm of the first thruster unit to change a first radius of the first mass as the first mass rotates. Moving the second mass along the second trajectory may comprise changing a second length of a second telescopic arm of the second thruster unit to change a second radius of the second mass as the second mass rotates.

In one or more embodiments, the first and second thruster units may be mirroring thruster units such that the first and second trajectories substantially mirror each other. The first and second masses may be rotated synchronously along the first and second trajectories, respectively.

In one or more embodiments, the first and second thruster units may comprise first and second tracks within which the first and second masses, respectively, are moved. Moving the first mass may comprise reciprocating the first mass within the first track. The first mass may be reciprocated using a first set of mechanical actuators. Moving the second mass may comprise reciprocating the second mass within the second track. The second mass may be reciprocated using a second set of mechanical actuators.

Various embodiments of the disclosure relate to a propulsion system comprising first and second thruster units. The first and second thruster units may be mirroring thruster units. Each of the first and second thruster units may have a movable mass and a mechanical actuator. The mechanical actuator may have a telescopic arm that changes length as it rotates the mass along a trajectory. The trajectory may include a first segment having a first radius and a second segment having a second radius. The first thruster unit may be positioned with respect to the second thruster unit such that forward momentums generated in the first segments of the first and second thruster units are additive. The first thruster unit may be positioned with respect to the second thruster unit such that non-forward momentums of the first and second thruster units are at least partially neutralized.

In one or more embodiments, the propulsion system may comprise a controller configured to control the mechanical actuators of the first and second thruster units. The mechanical actuators may be controlled to set rotational speeds for the rotating masses to control magnitudes of the forward momentums.

In one or more embodiments, the propulsion system may comprise a controller configured to control arm lengths of the first and second thruster units to modify mass trajectories.

Various embodiments of the disclosure relate to a propulsion system that may comprise a thruster. The thruster may comprise a movable mass. The thruster may comprise a mechanical actuator having a telescopic arm. The telescopic arm may change length as the movable arm rotates so as to move the mass along a trajectory. The trajectory may include a first segment and a second segment. The first segment may substantially follow a circular path. The second segment may deviate from the circular path. Deviation from the circular path may generate a momentum to propel the thruster in a direction.

In one or more implementations, the thruster may be tiltable such that the mass is rotatable in variable planes.

Various embodiments of the disclosure relate to a method of propulsion comprising controlling a mechanical actuator of a thruster. The mechanical actuator may be controlled to rotate a mass along a trajectory. The trajectory may include a first segment and a second segment. The first segment may substantially follow a circular path. The second segment may deviate from the circular path. Deviation from the circular path may generate a momentum to propel the thruster in a direction.

In one or more implementations, the method may comprise rotating the mass in variable planes to propel the thruster in variable directions.

DETAILED DESCRIPTION

Figure 1:
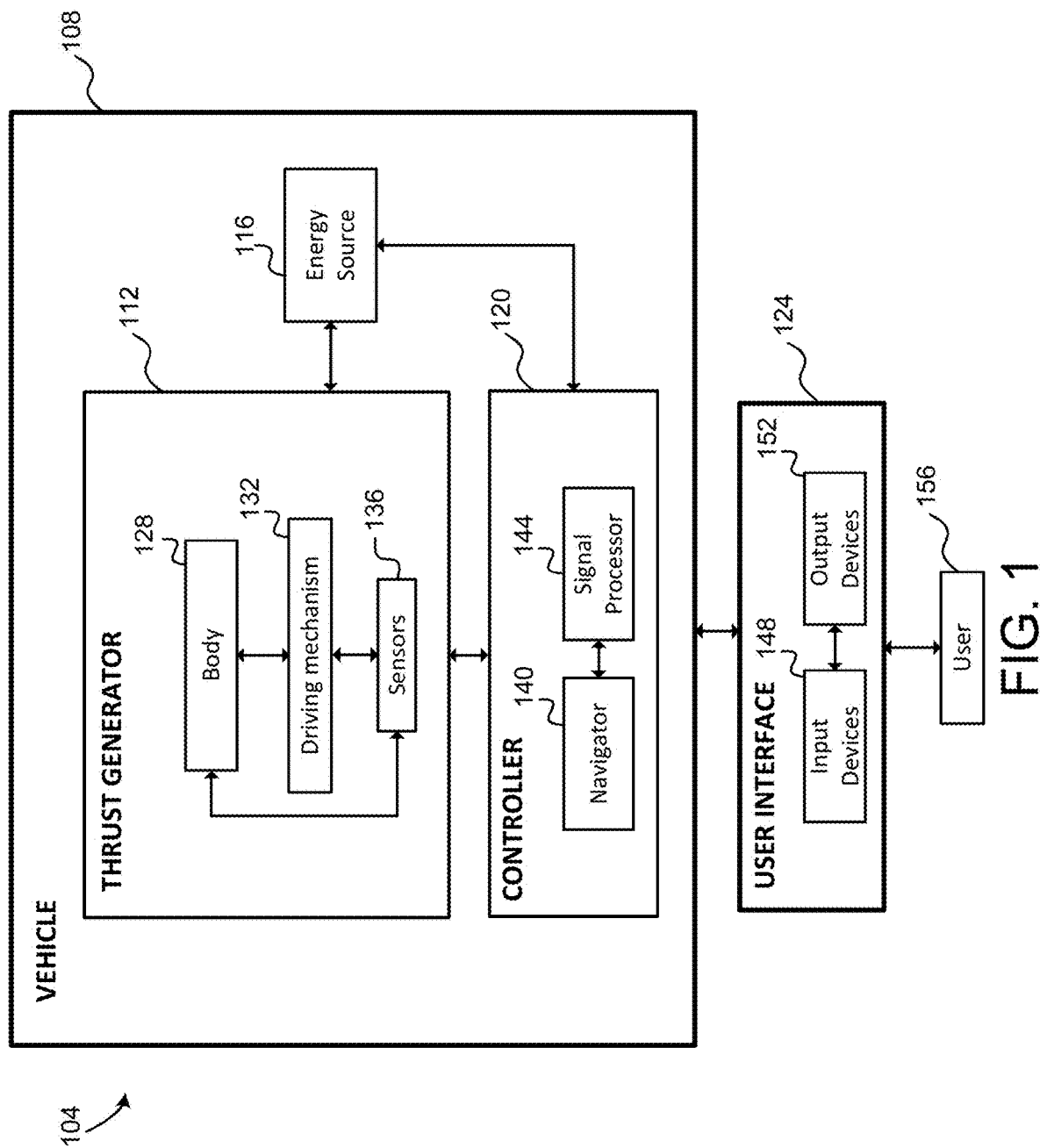
FIG. 1 shows the interactions within an example system containing a vehicle propelled by a propulsion thruster, in accordance with illustrative embodiments.

Reference will now be made to various embodiments, one or more examples of which are illustrated in the figures. The embodiments are provided by way of explanation of the invention, and are not meant as a limitation of the invention. For example, features illustrated or described as part of one embodiment may be used with another embodiment to yield still further embodiments. It is intended that the present application encompass these and other modifications and variations as come within the scope and spirit of the invention.

Disclosed herein are potential embodiments of a propulsion thruster and implementations thereof. In various versions, the thruster is a propellant-less drive able to capitalize on thrust resulting from differential momentums of moving objects. The propulsion thruster may be utilized to, for example, propel a vehicle in three dimensions through space, in the air, on and/or in the water, and/or on land. The propulsion thruster may be configured such that a single propulsion thruster operates within a vehicle or multiple propulsion thrusters operate in concert to propel a vehicle, such as spacecraft, aircraft, watercraft, and land vehicles. The propulsion thruster may operate through a series of discrete operational stages or cycles and/or through continuous cycles. Each propulsion thruster may be assembled such that it comprises one or more "thrusters" (used interchangeably with "thrust units" and "thruster units"). Thrust may be generated from one or more rotating masses with trajectories that deviate from circular paths. Multiple thrusters may be positioned and configured to combine, cancel, and/or counteract all or part of the thrust in desired and/or undesired (or relatively undesired) directions, leaving a net thrust in a desired direction. Cancellation or counteraction of thrust in undesirable directions may be achieved, for example, through "mirror-image" thrust units that are configured such that certain (undesirable) momentums of two or more thrust units are partially or wholly cancelled, and certain other (desirable) momentums of the thrust units are combined.

Any number of thrust units may be used and combined in any configuration to achieve the result desired. In some implementations, the amount of forward, rearward leftward, rightward, upward, and/or downward thrusts may be adjustable in real-time to achieve propulsion in different trajectories. Adjustments may be achieved by, for example, reorienting (e.g., by tilting) the thrust units in three dimensions (such that, e.g., the relative "forward" direction is reoriented to another direction, such that a "forward" thrust tends to direct the vehicle in, e.g., a rearward, downward, upward, leftward, or rightward direction), by modifying the amount of force applied to moving objects for certain periods of time to generate different amounts of thrust (such that, e.g., the "leftward" thrust of the right unit exceeds the "rightward" thrust of the left unit, leaving a net "leftward" thrust temporarily or indefinitely), etc.

The parameters of thrust units may be varied to modify net thrust magnitude and direction. For example, a controller may modify such parameters as rotational speed, axis of rotation, timing of cycles, synchronicity between and among thrust units, actuator forces, or any combination of these and other parameters to achieve the desired thrust. Such a controller may receive data from sensors situated in or around, or otherwise targeted at, thrust units. Changes in parameters may be determined and implemented based on sensor data and/or user inputs to achieve preset or input vectors.

In various embodiments, each rotation of a thrust unit may generate two linear propulsions. Two additive generated momentums per cycle yield a total of four generated linear momentums in each round (which comprises two cycles).

FIG. 1 shows a system 104 containing an example propulsion thruster according to potential embodiments. The propulsion thruster system 104 comprises a vehicle 108 and a user interface 124. The vehicle 108 includes a thrust generator 112, a controller 120, and an energy source 116. The energy source 116 powers the thrust generator 112 and the controller 120. The energy source 116 may comprise a battery, solar panels, and/or any other components capable of generating, supplying, and/or storing energy. The thrust generator 112 further comprises a body 128, a driving mechanism 132, and sensors 136. The body 128 comprises any structure required for the thrust generator 112 to function, including an individual or a plurality of thruster units which each further contain a movable mass capable of generating momentum. The body 128 may be attached to the driving mechanism 132 or it may be free to move within the thrust generator 112. Alternatively the body 128 may be selectively attached or detached from the internal structure of the thrust generator 112. The driving mechanism 132 comprises any mechanism capable of moving the body 128 of the thrust generator 112. The driving mechanism 132 may comprise any combination of one or more actuators and/or motors that move body 128, or components thereof, as part of thrust generation.

Controller 120 may include one or more processors and memory with instructions executable by the one or more processors to perform various functions. The controller 120 may receive data from, for example, thrust generator 112, user interface 124, and/or energy source 116, and may send control signals to, for example, thrust generator 112, user interface 124, and/or energy source 116.

In various embodiments, the controller 120 controls operation of the thrust generator 112 and/or components thereof. The controller 120 may comprise a navigator 140 and a signal processor 144. The navigator 140 is connected or otherwise in communication with the driving mechanism 132 (used interchangeably with "drive mechanism"), the signal processor 144, and the user interface 124. The navigator 140 may be configured to determine intended trajectories (e.g., "forward", "rearward", "leftward", "rightward", "upward", and "downward", or combinations thereof) based on data received from, for example, the driving mechanism 132, the signal processor 144, and/or the user interface 124. The navigator 140 may then determine which thrust generator 112 parameters would achieve the intended trajectory, and transmit corresponding control signals to the thrust generator 112. For example, the navigator 140 may transmit control signals to driving mechanism 132 to achieve the parameters that are determined to cause the thrust generator 112 to generate the thrust that would achieve the intended trajectory as determined based on user input, sensor readings, etc.

The driving mechanism 132 and the body 128 are further connected to or otherwise in communication with sensors 136. The sensors 136 may include sensors to detect and control speed, proximity, length, distance, orientation, inertia, acceleration, current, voltage, capacitance, etc. Further, the sensors 136 can provide feedback from the driving mechanism 132 in response to signals from the navigator 140. The loop comprising the navigator 140, the driving mechanism 132, the sensors 136, the signal processor 144, and the body 128 are in communication such that the thrust generator 112 is oriented and functioning appropriately such that the vehicle 108 can be propelled effectively in a desired direction.

The entire vehicle 108 may be propelled (via, e.g., thrust generator 112 controlled via controller 120) in a desired direction based on inputs 148 from a user 156 via user interfaces 124. User interfaces 124 may comprise input devices 148 (e.g., touchscreen, microphone, pressure sensor, levers, buttons, joysticks, computer mouse, keyboard, or any combination of these or other devices) for receiving inputs from users, and output devices 152 (e.g., display screen, speaker, haptic device, or any combination of these or other devices) for providing outputs to users. Entries received via input devices 148 may be sent to the navigator 140 of controller 120. The navigator 140 may use signals from user interface 124, in combination with signals from signal processor 144, sensors 136, driving mechanism 132, etc.) to generate and transmit signals to the driving mechanism 132 such that the driving mechanism 132 can be oriented or operated to generate thrust in a desired direction.

Sensors 136, which may sense the state of body 128 and receive signals from the driving mechanism 132 and/or other components of system 104, may send signals to the signal processor 144 for integration, interpretation, and/or other processing. Processed signals from signal processor 144 may be relayed to, for example, the navigator 140 for use in control of driving mechanism 132 and provided to the user as outputs via output devices 152 of user interface 124. Communications between and among the navigator 140, the signal processor 144, the output devices 152, the user 156, and input devices 148 form a loop that allows for the direction of propulsion to be continually or periodically monitored and corrected such that the vehicle can be correctly and effectively propelled as desired in various changing trajectories.

In various embodiments, the components of system 104 may be rearranged, reconfigured, combined, or separated as desired for different applications. Examples of potential applications include outer space travel (e.g., rockets), orbit in outer space (e.g., satellites, space stations), air travel (e.g. airplanes, drones), aquatic travel (e.g. surface watercraft, submarines), land travel (e.g. long range military vehicles), etc. For example, in certain embodiments, the user interface 124, or components thereof, may be in or on the vehicle 108, while in other embodiments, the user interface 124, or components thereof, may be separate from the vehicle 108 and in wired or wireless communication with the vehicle 108 or the thrust generator 112 thereof. Similarly, the controller 120, or components thereof, may be in or on the vehicle 108 and/or in or on the thrust generator 112, while in other embodiments, the controller 120, or components thereof, may be separate from the vehicle 108 and/or the thrust generator 112 and in wired or wireless communication with the vehicle 108 or the thrust generator 112 thereof. In some implementations, one or more sensors 136, or components thereof, may be separated from the thrust generator 112 but may be in or on vehicle 108, and/or may be in or on the controller 120 and/or the user interface 124.

Figure 2:
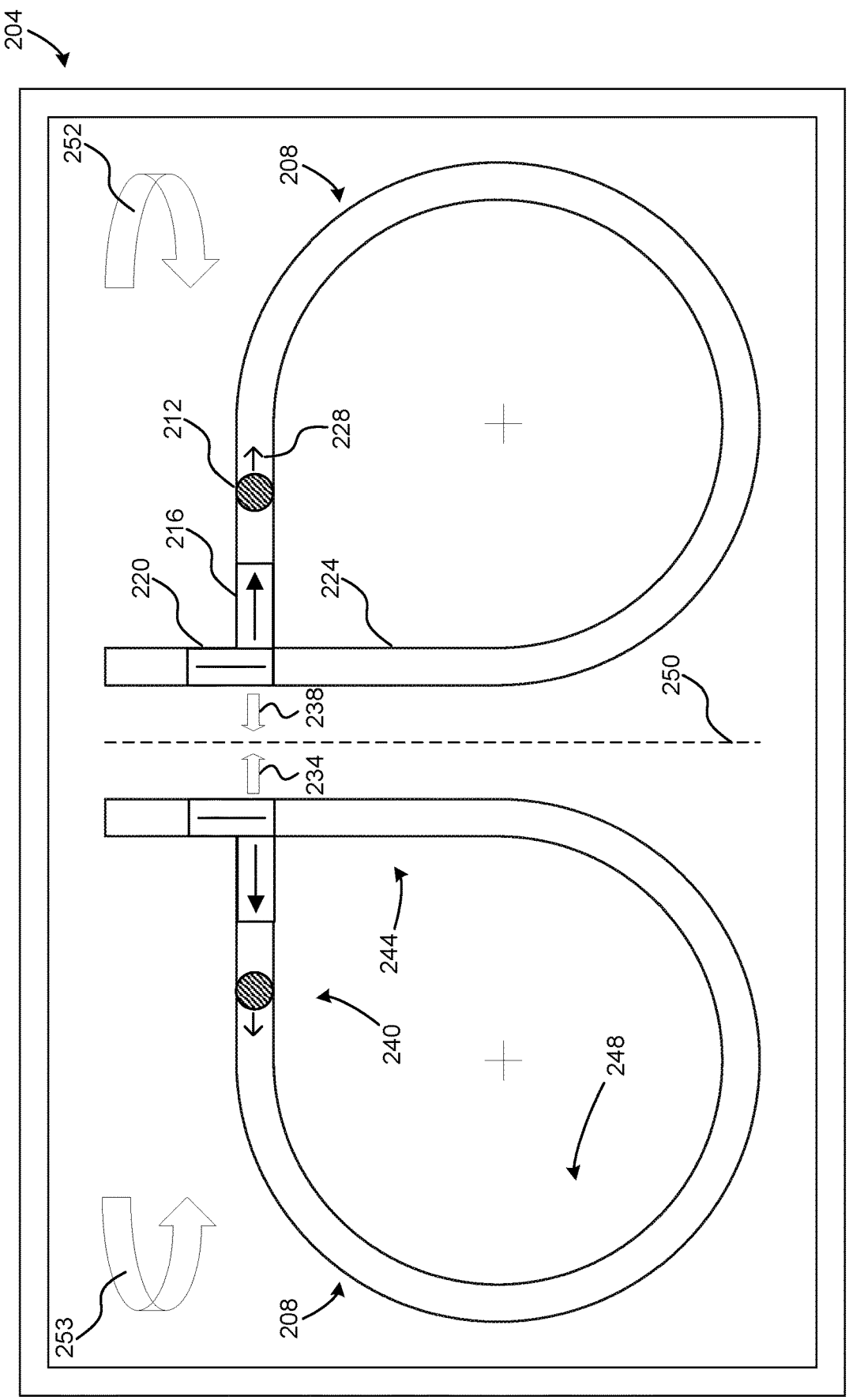
FIG. 2 shows a top view of a propulsion thruster in a first potential operational stage, in accordance with illustrative embodiments.

FIG. 2 shows a top view of an example two-cycle thrust generator 204 according to illustrative embodiments. The thrust generator 204 comprises two identical, structurally-mirroring units 208. The structurally-mirroring units 208 are mirrored about a central axis 250. Each unit 208 comprises a track 224, a mass 212 that is movable within track 224, and drivers 216 and 220. The track 224 may be a closed track. Within each unit 208, the pair of drivers 216 and 220 work in concert to reciprocate mass 212 between the terminal ends (each end adjacent to either driver 216 or driver 220) of track 224. The movement of mass 212 in each unit 208 generates a momentum. The two units 208 can be oriented relative to each other such that some components of the directional momentum within each unit 208 may be counteracted and other momentum components may be combined to generate thrust in a desired direction.

Figure 3:
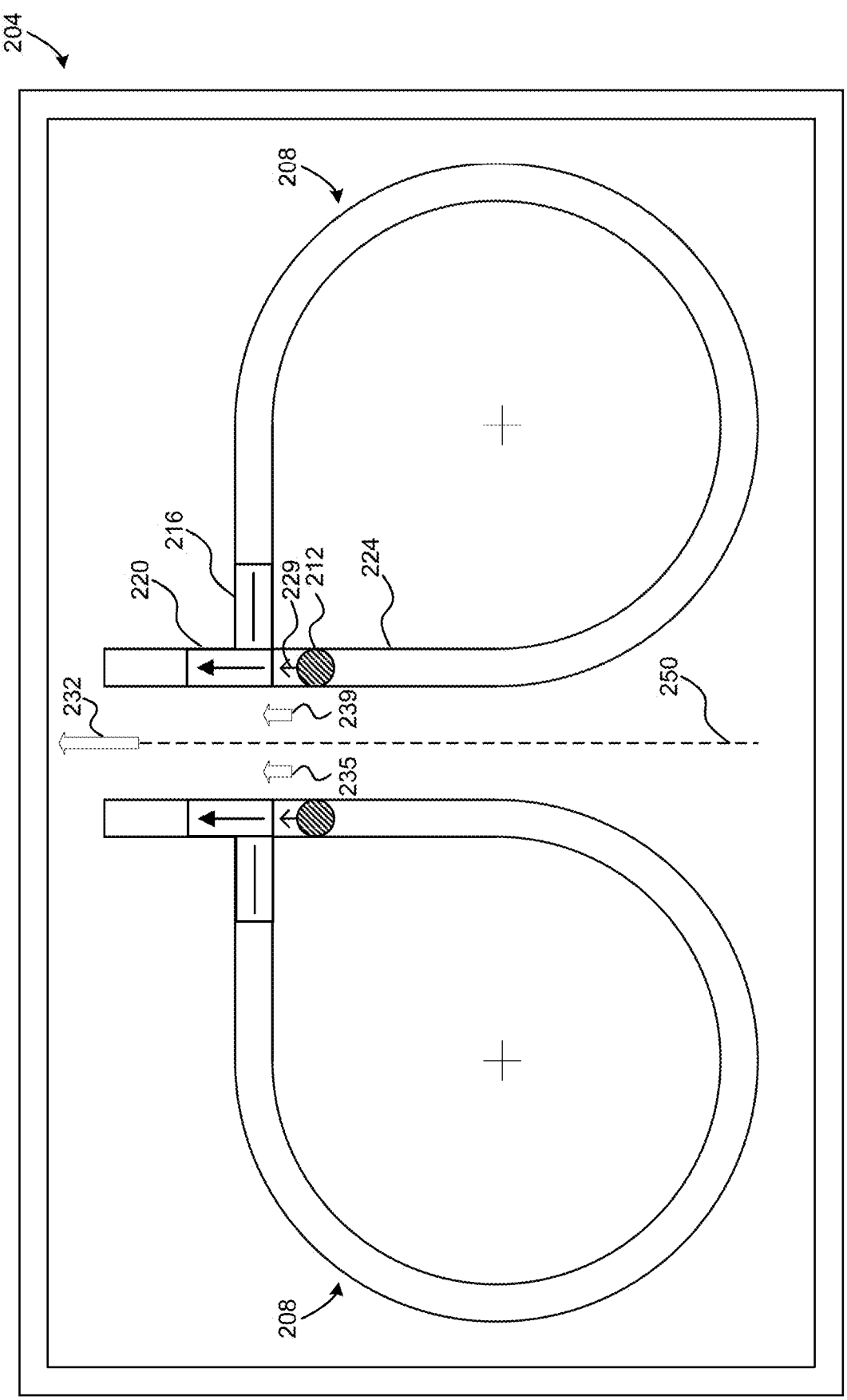
FIG. 3 shows a top view of the propulsion thruster of FIG. 2 in a second potential operational stage, in accordance with illustrative embodiments.
Figure 4:
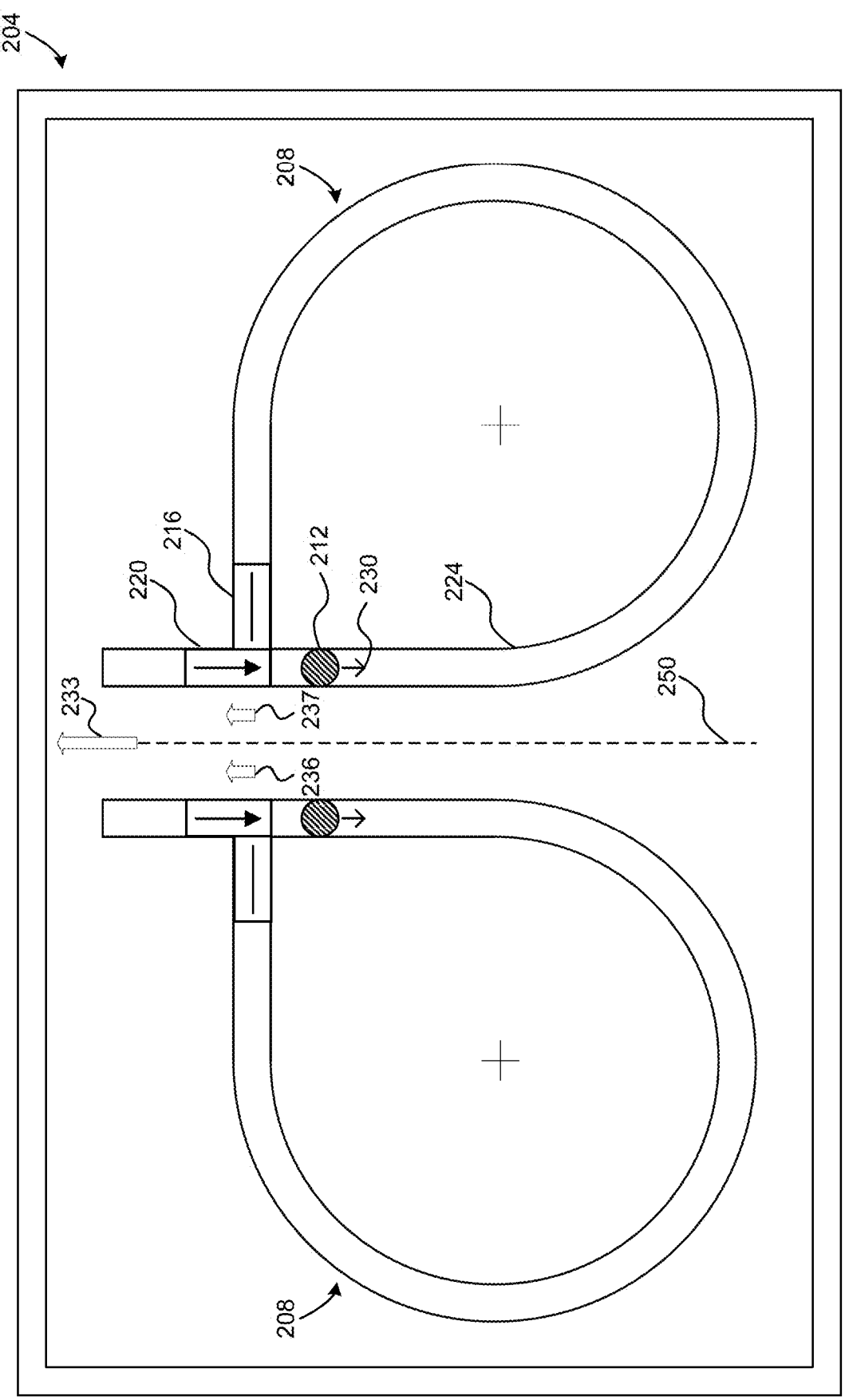
FIG. 4 shows a top view of the propulsion thruster of FIGS. 2 and 3 in a third potential operational stage, in accordance with illustrative embodiments.
Figure 5:
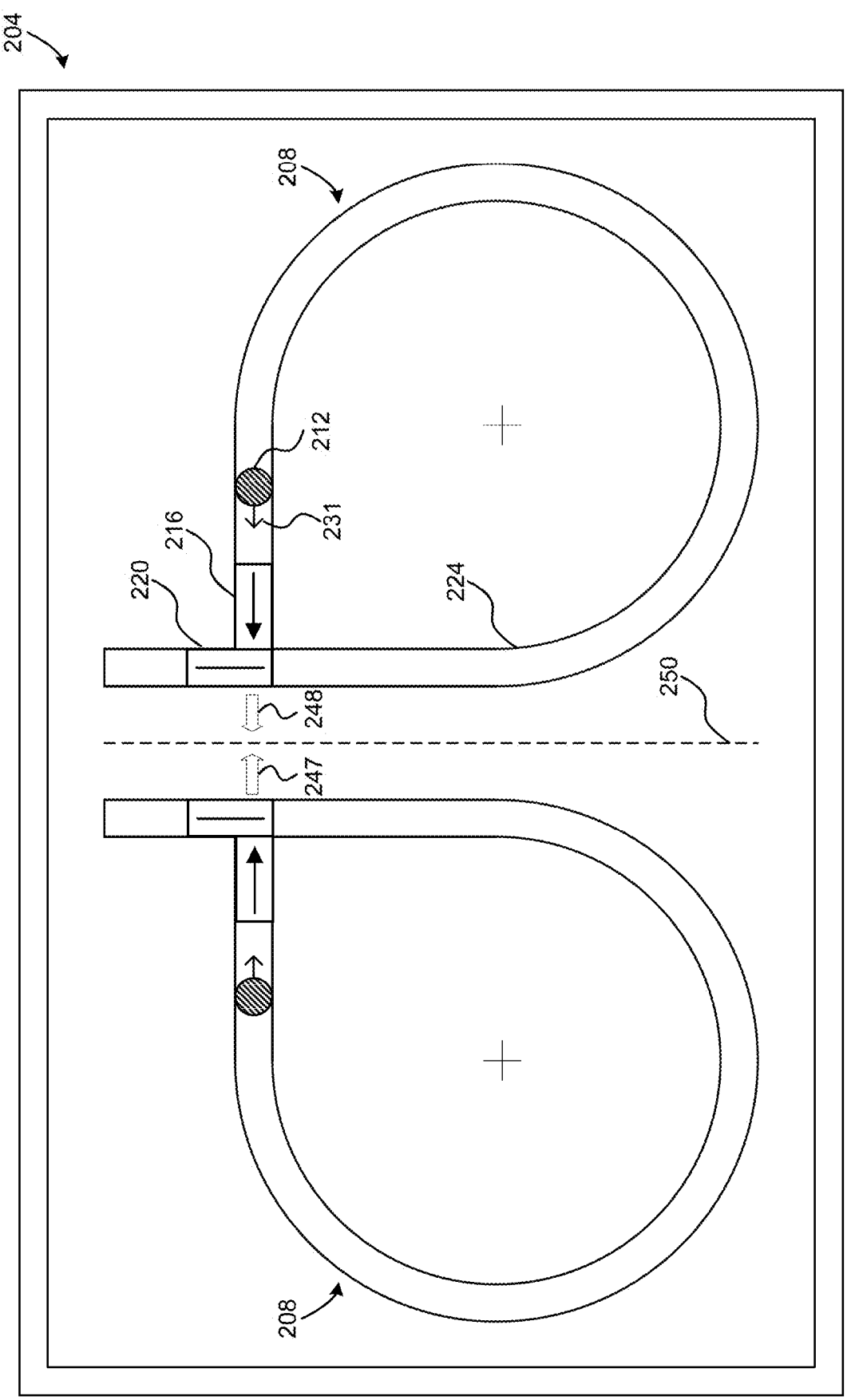
FIG. 5 shows a top view of the propulsion thruster of FIGS. 2-4 in a fourth potential operational stage, in accordance with illustrative embodiments.

The two-cycle thrust generator 204 depicted in FIGS. 2, 3, 4, and 5 generates unidirectional momentum through two operational cycles. FIGS. 2 and 3 correspond with first and second operational stages of a first cycle, and FIGS. 4 and 5 correspond with third and fourth operational stages of a second cycle. According to illustrative embodiments, FIG. 2 shows a top view of the two-cycle thrust generator 204 at the start of cycle 1; FIG. 3 shows a top view of the two-cycle thrust generator 204 at the end of cycle 1; FIG. 4 shows a top view of the two-cycle thrust generator 204 at the beginning of cycle 2; and FIG. 5 shows a top view of the two-cycle thrust generator 204 at the end of cycle 2. The track 224 is shaped such that it comprises a circular section 248 and two linear sections 240 and 244. The track 224 starts with first substantially linear section 240 at driver 216, forms approximately three-quarters of a circle at 248, and is followed by a second substantially linear section 244 that ends at actuator 220. The movement of mass 212 along track 224 in both units 208 result in a net generated momentum 232 that is directionally parallel with the central axis 250 and in a "forward" direction.

In various embodiments, movement of mass 212 through track 224 may be facilitated by a lubricant such as graphite, oils, grease, etc. In an additional embodiment, the lubricant that may be used to facilitate movement of mass 212 through track 224 may be further combined with bearings or bushings. In various embodiments, track 224 may have a circular cross-section. Alternatively, track 224 may have a rectangular/square or other polygonal cross section. In another embodiment, mass 212 may be spherical or ellipsoid in shape. Alternatively, mass 212 may be rectangular in shape or it may be shaped as any polyhedron matching the polygonal cross-section of or otherwise fitting through the track 224.

In various embodiments, each driver 216 and 220 may comprise of one or more actuators. Each actuator within drivers 216 and 220 may be hydraulic, pneumatic, vacuum, etc. In various embodiments, drivers 216 and 220 contain identical or similar actuator types or drivers 216 and 220 may contain actuators of different types or they may contain some similar/identical actuator types and some different actuator types.

According to illustrative embodiments, at the start of cycle 1 in each unit 208, driver 216 propels mass 212 in direction 228 (leftward for the left unit, rightward for the right unit, as oriented in FIG. 2) through closed track 224. Due to recoil, the units experience momentums in opposing directions. Consequently, the left unit in FIG. 2 experiences rightward momentum 234 (which corresponds with the momentum generated by the left unit), and the right unit in FIG. 2 experiences leftward momentum 238 (which corresponds with momentum generated by the right unit). Because the two units are oriented so as to "mirror" each other, the rightward momentum 234 and the leftward momentum 238 partially or entirely neutralize or otherwise counteract each other.

FIG. 3 shows a top view of the two-cycle thrust generator 204 at the end of the first cycle. At the end of cycle 1 in each unit 208, mass 212 collides with driver 220 as it moves in direction 229. The mass 212 and driver 220 then move in synchrony until movement of mass 212 ceases. The collision of mass 212 at driver 220 generates forward ("upward" as illustrated in FIG. 3) momentums in the two units. Specifically, the left unit generates forward momentum 235 and the right unit generates forward momentum 239. Because both are in the same (or substantially same) direction, the momentums 235 and 239 (or components thereof that are in the same direction) are additive, generating net momentum 232.

In various embodiments, mass 212 moves synchronously with a portion of driver 220. In alternative embodiments, mass 212 moves synchronously with the entirety of driver 220. In various embodiments, the cessation of the movement of mass 212 is facilitated by a damping mechanism or system. In further embodiments, the damping mechanism or system may comprise hydraulic dampers, pneumatic dampers, springs, polymers, etc. In another embodiment, the damping mechanism or system may be attached to or part of the driver 220. In yet another embodiment, the damping mechanism may be attached to or part of the track 224. In an additional embodiment, the damping mechanism may be part of the mass 212.

According to illustrative embodiments, FIG. 4 shows a top view of the two-cycle thrust generator 204 at the beginning of the second cycle. At the beginning of the cycle 2 in each unit 208, driver 220 propels mass 212 in direction 230 through track 224. The mass 212 starts movement at one end of track 224 and into a linear portion 244 of track 224, proceeds through a circular portion 248 towards actuator 216, and enters another linear portion 240 at an opposing end of track 224. The speed of the movement of mass 212 can be manipulated such that the generated thrust 233, pictured in a "non-forward" direction, is minimal. Specifically, the left unit generates forward momentum 236 and the right unit generates forward momentum 237. Because both are in the same (or substantially same) direction, the momentums 236 and 237 (or components thereof that are in the same direction) are additive, generating net momentum 233.

In accordance with an illustrative embodiment, FIG. 5 shows a top view of the two-cycle thrust generator 204 at the end of the second cycle. At the end of cycle 2 in each unit 208, the mass 212 collides with driver 216 as it moves in direction 231. The units experience momentums in opposing directions due to the collisions of masses 212 traveling in opposing directions. Consequently, the left unit in FIG. 2 experiences rightward momentum 247, and the right unit in FIG. 5 experiences leftward momentum 248. Because the two units have a mirroring configuration, the rightward momentum 247 and the leftward momentum 248 partially or entirely neutralize or otherwise counteract each other.

Driver 216 neutralizes the movement of mass 212 through track 224 and resets the units for the next start of cycle 1. In various embodiments, the neutralization of the movement of mass 212 is facilitated by a damping mechanism or system. In further embodiments, the damping mechanism or system may comprise hydraulic dampers, pneumatic dampers, springs, polymers, etc. In another embodiment, the damping mechanism or system may be attached to or part of the driver 216. In yet another embodiment, the damping mechanism may be attached to or part of the track 224. In an additional embodiment, the damping mechanism may be part of the mass 212.

In various embodiments, cycles 1 and/or 2, or phases thereof, in each of the units 208 may be made synchronous and asynchronous as desired. For example, the two units 208 may be controlled such that mass 212 is propelled at the same time at the start of cycle 1, and/or that mass 212 is propelled at the same time at the start of cycle 2. In another embodiment, the start of cycle 1 may be asynchronous between units 208 and the start of cycle 2 may be synchronous. In another embodiment, the start of cycle 1 may be synchronous between units 208 and the start of cycle 2 may be asynchronous between units 208. In yet another embodiment, the start of cycle 1 and 2 in each of the units 208 may be asynchronous.

In various embodiments, the force applied to mass 212 to propel the mass 212 at the start of cycles 1 and 2 may be controlled to change the momentum generated in each unit. In various embodiments, a controller adjusts the timing and/or force applied to mass 212 to achieve the same momentums 234 and 238 so that they cancel each other out. In a further embodiment, the controller may also, for some or all cycles, set the timing and/or force to achieve momentums that do not cancel each other out, so as to achieve a net leftward or net rightward momentum and thereby achieve propulsion in other directions. In certain embodiments, the controller, for some or all cycles, may set the timing and/or force to achieve momentums that only partially cancel out. In further embodiments the controller, for some or all cycles, may set the timing and/or force to increase or decrease the speed of mass 212 to achieve different magnitudes of generated momentums.

In various embodiments, the units 208 may be tilted with respect to each other (via one or more actuators) to achieve propulsion in different select directions. For example, the units 208 may be tilted about central axis 250 (e.g., in directions indicated by the arrows 252 and 253), an axis that is perpendicular to axis 250, or another axis in three dimensions. The combination of varying momentums 234 and 238 in varying directions can be used to achieve net momentums 232 that are in directions other than forward, such as upward (out of the page) and downward (into the page) propulsion. Also, reversing the direction of one or both of the masses 212 may achieve different net momentums that may, for example, be used to turn thrust generator 204 around (e.g., via a clockwise or counterclockwise rotational momentum) or otherwise achieve different trajectories. Units 208 may be tilted mid-cycle or between two cycles to achieve different trajectories. In certain embodiments, units 208 may be tilted synchronously in the same direction or in mirrored synchrony. In other embodiments, units 208 may be titled independently and/or in different directions. Tilting of units, changes in cycle parameters (such as direction in which masses move, speed of rotation, timing of cycles, etc.) can be used to achieve greater agility, enhancing maneuverability and responsiveness in vehicles.

In various embodiments, due to natural deformations or other structural changes in components of thrust generator 204 over time, a feedback loop may be used to adjust start time, force applied to mass to propel the mass, and other parameters to compensate for such changes. For example, if over time friction in one of the tracks increases relative to the other track, greater force may be needed in one unit relative to the other to allow the masses to reach the same operational stage (e.g., end of cycle 1) at the same time. Similarly, structural changes may result in the momentum produced by one unit varying over time with respect to the other, requiring changes in timing, force, etc. to compensate.

In various embodiments, a speed at which mass 212 moves through track 224 is able to be set and manipulated via sensors (identical or similar to 136), controllers (identical or similar to 120), and user interfaces (identical or similar to 124). In further embodiments, the setting and manipulation of the speed of mass 212 may be facilitated by manipulation of drivers 216 and 220 in concert with damping mechanisms or systems via sensors (identical or similar to 136), controllers (identical or similar to 120), and user interfaces (identical or similar to 124).

In alternative embodiments, two-cycle thrust generator 204 can be arranged such that units 208 are configured to individually and independently move in more than one plane such that a net thrust may be generated by each unit 208 in desired directions (e.g., "forward" and "leftward", etc.). In various embodiments, the units 208 may be independently adjusted in response to user input. In another embodiment, units 208 may each generate a net thrust in an identical direction or each unit 208 may independently generate a net thrust which may or may not be in the same direction as the complimentary unit 208. In another embodiment, each mass 212 may move through each track 224 in each unit 208 at the same or similar speed. In alternative embodiments, each mass 212 may move through each track 224 in each unit 208 at different speeds. In further embodiments, the speed at which mass 212 moves through track 224 in each unit 208 may or may not be sensed, set, and controlled by the same sensors, controllers, and user interfaces. In another embodiment, two-cycle thrust generator 204 can be arranged such that units 208 are configured in the same spatial plane and net thrust is generated in the same plane as the units. In further embodiments, two-cycle thrust generator 204 may be configured such that units 208 are located in the same spatial plane and both units may be free to move and/or rotate synchronously, maintaining coplanar operation. In another alternative embodiment, a plurality of two-cycle thrust generator 204 can be used to generate a net thrust in a desired direction. In further embodiments, the plurality of 2-cycle thrust generator 204 may include individual 2-cycle thrust generators 204 that may or may not be proximal to each other and/or oriented in the same or similar spatial directions.

In various embodiments, each unit 208 may be powered by a different energy source (identical or similar to 116). In another embodiment, each unit 208 may be powered by the same energy source. In further embodiments, the energy source may be a battery, a generator, an engine etc. that is powered by solar energy, hydrogen energy, additional batteries, nuclear energy, etc. Batteries can be charged using any method deemed suitable for the application.

Figure 6:
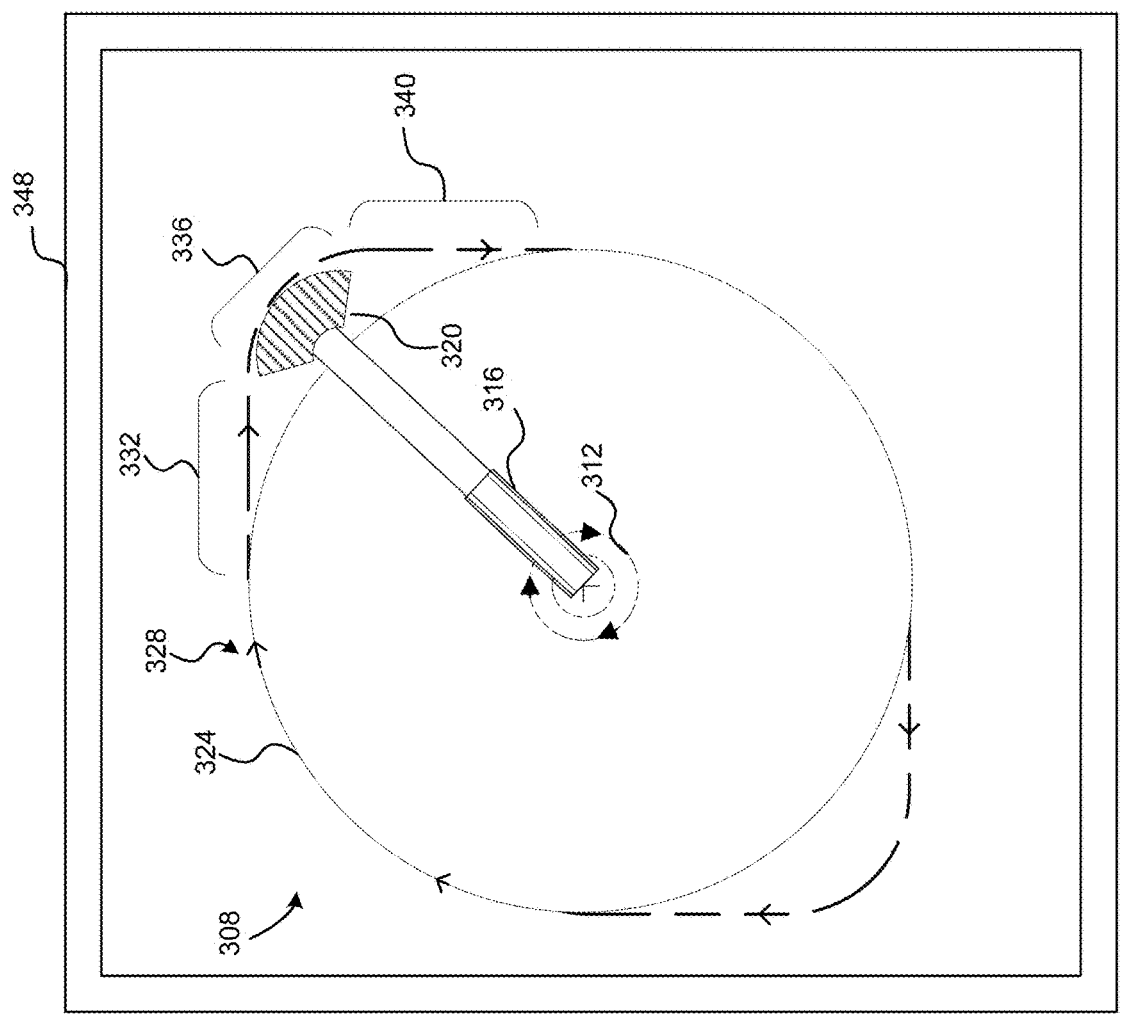
FIG. 6 shows a top view of a propulsion thruster, in accordance with illustrative embodiments.

FIG. 6 shows a top view of one side of a continuous thrust generator, according to illustrative embodiments. Unit 308, contained in body 348, comprises a driver 312 that is secured to mass 320 via a telescopic arm 316. The driver 312 moves mass 320 along circular trajectory 324 in direction 328. The telescopic arm 316 is controllable such that it is able to change in length as it rotates. To generate thrust during operation of both units, driver 312 moves telescopic arm 316 and attached mass 320 along a circular trajectory 324 until telescopic arm 316 controllably increases in length and subsequently returns to the original length. The telescopic arm 316 starts at a length such that mass 320 follows circular trajectory 324. The telescopic arm 316 then increases in length during increasing section 332, remains at an increased length during deviation section 336, and decreases in length during decreasing section 340 to return to original trajectory 324. The change in telescopic arm 316 length in mirroring units facilitates generation of thrust by mass 320.

In various embodiments, unit 308 may be controlled such that the telescopic arm changes length multiple times in one cycle, resulting in multiple deviations from a circular trajectory. In certain embodiments, the multiple deviations may occur strategically along circular trajectory 324 so that certain momentums generated by each subsequent deviation are additive and other generated momentums are completely or partially neutralized. For example, if a vehicle is to maintain its position, the mass may be rotated at the same radius, such that there is no net momentum in, for example, a forward or other direction. In various embodiments, the telescopic arm may maintain the same length through one or more cycles. In further embodiments, the speed at which the telescopic arm may be controllably varied during extension and retraction. In certain embodiments, the extension and retraction speeds may be the same or similar. In other embodiments, the extension and retraction speeds may be different.

In various embodiments, the shape of mass 320 is wedge shaped. In another embodiment, the shape of mass 320 is a cube, rectangle, or another polyhedron. In further embodiments, mass 320 is spherical or elliptical. In another embodiment, telescopic arm 316 has a circular or elliptical cross-section. In alternative embodiments, telescopic arm 316 has a cuboid, rectangular, or polygonal cross-section. In various embodiments, mass 320 is integrated with, or is a portion of, arm 316. For example, arm 316 may be hollow (or otherwise less dense) along its length, but may have a solid (or otherwise more dense) terminus. Similarly, the arm may be relatively larger at its terminus, achieving a greater mass at its end. In alternative embodiments, mass 320 (whether separate or integrated with arm 316) is positioned midway along the arm rather than at its terminus. In certain embodiments, the mass may be movable along the length of the arm. In some embodiments, the mass can be positioned and repositioned at different points along the arm.

In various embodiments, circular trajectory 324 may or may not be perfectly circular. Trajectory 324 may be nearly circular or ellipsoidal. In another embodiment, driver 312 comprises one or more actuators. The one or more actuators may be one or more of the following: hydraulic, pneumatic, vacuum, etc. In another embodiment, the trajectory of mass 320 may include multiple increasing sections 332, deviation sections 336, and decreasing sections 340. In an additional embodiment, telescopic arm 316 changes in length via hydraulic mechanisms or systems, pneumatic mechanisms or systems, lead screw(s), etc. In various embodiments, unit 308 may rotate and/or translate in space as driver 312 moves mass 320 through trajectory 324 and/or one or more increasing sections 332, deviation sections 336, and decreasing sections 340. In various embodiments, unit 308 may be tilted to achieve momentum in three dimensions, such as upward and downward in addition to forward and backward.

In various embodiments, a speed at which mass 320 moves within unit 308 may be set and manipulated, using data from sensors (identical or similar to 136), via controllers (identical or similar to 120) and/or user interfaces (identical or similar to 124). In further embodiments, the setting and manipulation of the speed of mass 320 may be facilitated by manipulation of drivers 312 in concert with damping mechanisms or systems via sensors (identical or similar to 136), controllers (identical or similar to 120), and user interfaces (identical or similar to 124). In further embodiments, the damping mechanism or system may comprise hydraulic dampers, pneumatic dampers, springs, polymers, etc. In another embodiment, the damping mechanism or system may be attached to or part of the driver 312. In an additional embodiment, the damping mechanism may be part of the mass 320. In various embodiments, the unit 308 may be tiltable (via one or more actuators) about any axis in three dimensions to achieve propulsion in different select directions. Because, in certain implementations, a single unit similar or identical to 308 may not be expected to be controlled such that generated momentums contribute to thrust in desired directions, it may be advantageous to configure movements of the two masses in two thrust units embodiments to operate simultaneously as synchronized mirror images.

Figure 7:
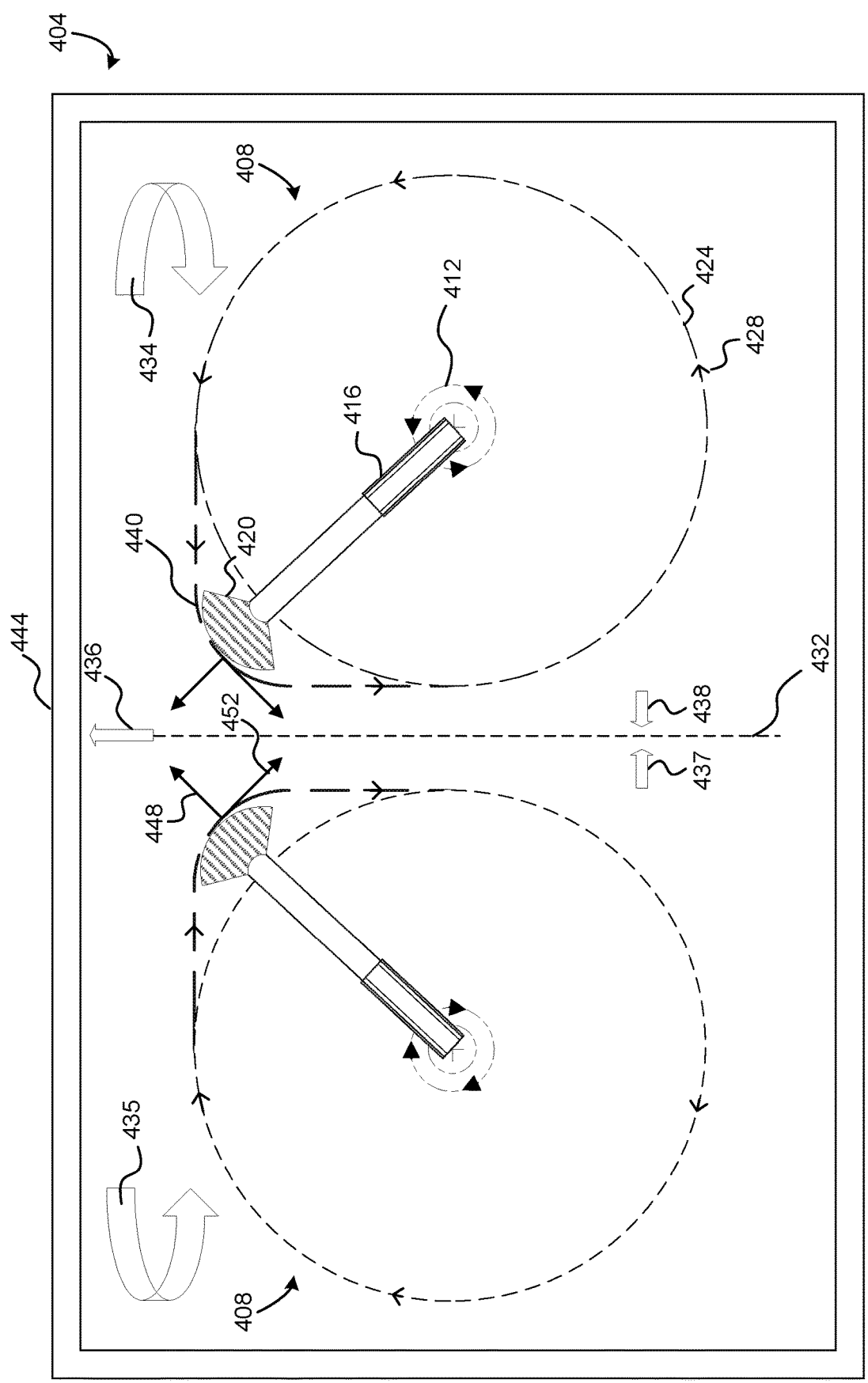
FIG. 7 shows a top view of a propulsion thruster, in accordance with illustrative embodiments.

FIG. 7 shows a top view of a continuous thrust generator, according to illustrative embodiments. A continuous thrust generator 404 can be designed using two units 408, each similar or identical to continuous thrust generator units 308. In continuous thrust generator 404, both units 408 may be situated in body 444 such that the units 408 are mirrored about a central axis 432. The mirroring configuration of units 408 facilitates the generation of a net thrust in a desired direction while undesired components of generated thrust can be counteracted or neutralized between the two mirroring units 408. In each unit 408, driver 412 is connected to a movable mass 420 via a telescopic arm 416. The driver 412 propels mass 420 along a circular trajectory 424 in direction 428. Telescopic arm 416 can change in length in response to a controller signal to alter the trajectory of mass 420 from circular trajectory 424 to a deviated trajectory 440 during which the telescopic arm 416 has greater length than during circular trajectory 424. The deviated trajectory 440 in both units 408 allow for a net generated thrust 436 in various directions, such as a direction parallel with the central axis 432. Each unit 408 may generate a momentum as a result of changes in length of the arm. In various embodiments, outward forces 448 and tangential forces 452 are present on the mass 420 during operation of units 408, resulting from rotation along trajectory 424. In certain embodiments, outward forces 448 and tangential forces 452 will contribute to generation of momentums. Generated momentums will comprise components oriented in a desirable direction (e.g. "forward", "rearward", "rightward", "leftward", "upward", "downward", etc.) and components oriented in non-desirable directions. In various embodiments, movement of masses 420 by actuators 412 generates momentums in the two units. Depending on operational parameters in the two units (e.g., rotational direction, speed, timing, etc.), the left unit may generate momentums including substantially rightward momentum 437 and the right unit may generate momentums including substantially leftward momentum 438. Because both are collinear (or substantially collinear), the momentums 437 and 438 (or components thereof that are collinear) may be at least partially neutralized. Remaining components of the momentums generated by units 408 may be additive, resulting in a net momentum, such as momentum 436.

The speed of mass 420 and the length of telescopic arm 416 may be manipulated adjusted such that at various points along the trajectory, the various forces experiences can be increased or decreased. For example, decreasing the speed of rotation just before a telescopic arm is to retract (so as to decrease its length) may decrease outward forces 448 that would resist the retraction, making it easier to decrease the length of the arm.

In various embodiments, the shape of masses 420 is wedge shaped. In another embodiment, the shape of mass 420 is a cube, rectangle, or another polyhedron. In further embodiments, masses 420 is spherical or elliptical. In another embodiment, telescopic arm 416 in each unit 408 has a circular or elliptical cross-section. In alternative embodiments, telescopic arms 416 have a cuboid, rectangular, or polygonal cross-section. In various embodiments, the shape of masses 420 is the same or similar in each unit 408. In another embodiment, the shape of masses 420 is different in each unit 408. In another embodiment, the cross-section of telescopic arm 416 is the same or similar in each unit 408. In alternative embodiments, the cross-section of telescopic arm 416 is different in each unit 408.

In various embodiments, trajectory 424 in each unit 408 may or may not be perfectly circular. Trajectory 424 may be nearly circular or ellipsoidal. In another embodiment, driver 412 comprises one or more actuators. The one or more actuators may be one or more of the following: hydraulic, pneumatic, vacuum, etc. In another embodiment, the trajectory of mass 420 may include multiple deviated trajectories 440. In an additional embodiment, telescopic arm 416 changes in length via hydraulic mechanisms or systems, pneumatic mechanisms or systems, lead screw(s), etc. In various embodiments, units 408 may rotate and/or translate in space as drivers 412 move masses 420 each through a trajectory 424 and/or one or more deviated trajectories 440.

In various embodiments, a speed at which each mass 420 moves within each unit 408 is able to be set and manipulated, based on data from sensors (identical or similar to 136), using controllers (identical or similar to 120) and/or user interfaces (identical or similar to 124). In further embodiments, the setting and manipulation of the speed of each mass 420 may be facilitated by manipulation of drivers 412 in concert with damping mechanisms or systems via sensors (identical or similar to 136), controllers (identical or similar to 120), and user interfaces (identical or similar to 124). In further embodiments, the damping mechanism or system may comprise hydraulic dampers, pneumatic dampers, springs, polymers, etc. In other embodiments, the damping mechanism or system may be attached to or part of the drivers 412. In additional embodiments, the damping mechanism may be part of the mass 420. In additional embodiments, the speed at which each mass 420 is moved in each unit 408 is the same or similar. In alternative embodiments, the masses 420 are moved at different speeds in each unit 408.

Figure 8:
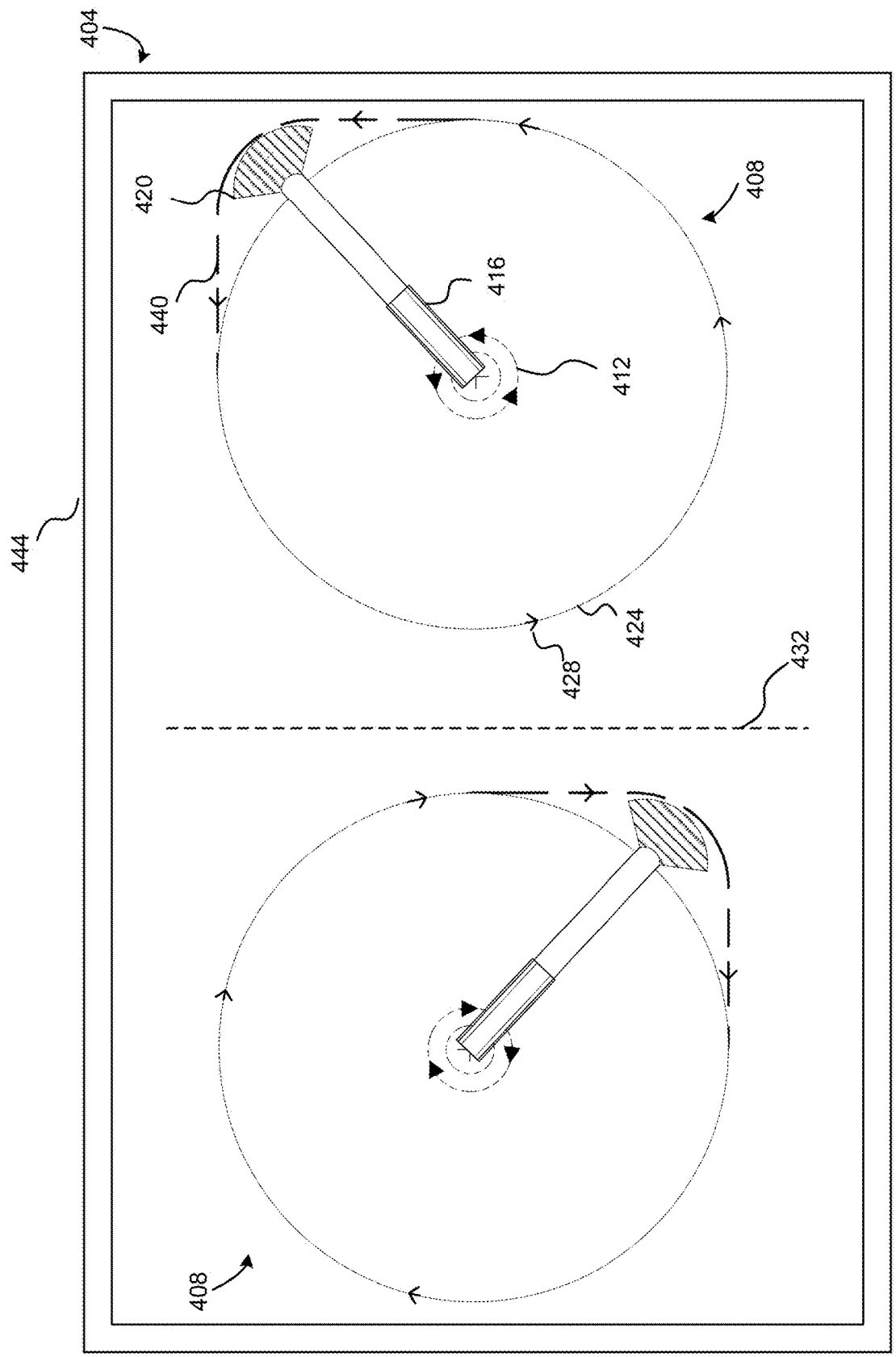
FIG. 8 shows a top view of a propulsion thruster, in accordance with illustrative embodiments.

FIG. 8 shows a top view of a continuous propulsion thruster, in accordance with an illustrative embodiment. A continuous thrust generator 404 can be designed using two units 408, each similar or identical to propulsion thruster 308. In continuous thrust generator 404, both units 408 are situated in body 444 such that the units 408 are mirrored about a central axis 432. The mirroring configuration of units 408 facilitates the generation of a net thrust in a desired direction as undesired components of generated thrust may be counteracted or neutralized between the two mirroring units 408. In each unit 408, driver 412 is connected to a movable mass 420 via a telescopic arm 416. The driver 412 propels mass 420 along a substantially circular trajectory 424 in direction 428. In various embodiments, telescopic arm 416 can change length in response to a controller signal (similar or identical 120) to alter the trajectory of mass 420 from trajectory 424 to a deviated trajectory 440 during which the telescopic arm 416 has greater length than during trajectory 424. In an embodiment, an extension speed and a retraction speed of telescopic arm 416 may be the same. In another embodiment, the extension and retraction speeds of telescopic arm 416 may be different. In a further embodiment, the extension and retraction speeds of telescopic arm 416 may be variable. Figures, including FIG. 8, are not necessarily to scale and all dimensions can be changed as deemed suitable. For example, the extent of deviated trajectory 424 may be greater or smaller, the diameter and proportions of telescopic arm 416 may be larger or smaller, etc.

In various embodiments, the units 408 can be controlled such that the mass 420 in each unit do not move in mirrored synchrony. In various embodiments, units 408 can be individually controlled (via a controller similar or identical to 120) such that the deviated trajectory 440 can occur at different times or locations along trajectory 424 in each unit 408. In various embodiments, drivers 412 and telescopic arms 416 can be configured such that multiple controllers can determine the rotation speed, the telescopic arm 416 length, and the location and timing of the deviated trajectory 440 in each unit 408. In various embodiments, the speed at which masses 420 move through each unit 408 may be the same in each unit 408. In another embodiment, the masses 412 may move at different speeds in each of the units 408. In further embodiments, the speed at which each mass 420 moves through each unit 408 may or may not be sensed, set, and controlled by the same sensors, controllers, and user interfaces.

In alternative embodiments, continuous thrust units 408 may be configured to individually move in more than one plane such that net thrust can be generated in multiple desired directions (i.e. "forward" and "leftward", etc.) and the direction(s) of generated thrust may adjust in response to user input. In another embodiment, propulsion thruster 404 can be arranged such that units 408 are configured in the same spatial plane and net thrust is generated in the same plane as the units. In further embodiments, continuous generator 404 may be configured such that units 408 are located in the same spatial plane and both units may be free to move and/or rotate synchronously, maintaining coplanar operation. In various embodiments, a plurality of propulsion thrusters 404 can be used to generate a net thrust in a desired direction. In further embodiments, the plurality of continuous thrust generator 404 may include individual continuous thrust generators 404 that may or may not be proximal to each other and/or oriented in the same or similar spatial directions.

As with other versions, units 408 may be tilted with respect to each other (via one or more actuators) to achieve propulsion in different select directions, in various embodiments. For example, the units 408 may be tilted about central axis 432, (e.g., in directions indicated by the arrows 434 and 435), an axis that is perpendicular to axis 432, or another axis in three dimensions. The combination of varying momentums in varying directions can be used to achieve net momentums 436 that are in directions other than forward, such as upward (out of the page) and downward (into the page) propulsion. Also, reversing the direction of one or both of the masses 420 may achieve different net momentums that may, for example, be used to turn thrust generator 404 around (e.g., via a clockwise or counterclockwise rotational momentum) or otherwise achieve different trajectories. Tilting of units, changes in cycle parameters (such as direction in which masses move, speed of rotation, timing of cycles, etc.) can be used to achieve greater agility, enhancing maneuverability and responsiveness in vehicles.

In various embodiments, each unit 208/408 may be powered by a different energy source (identical or similar to 116). In another embodiment, each unit 208/408 may be powered by the same energy source. In further embodiments, the energy source may be a battery, a generator, an engine etc. that is powered by solar energy, hydrogen energy, additional batteries, nuclear energy, etc. Batteries can be charged using any method deemed suitable for the application.

Figure 9:
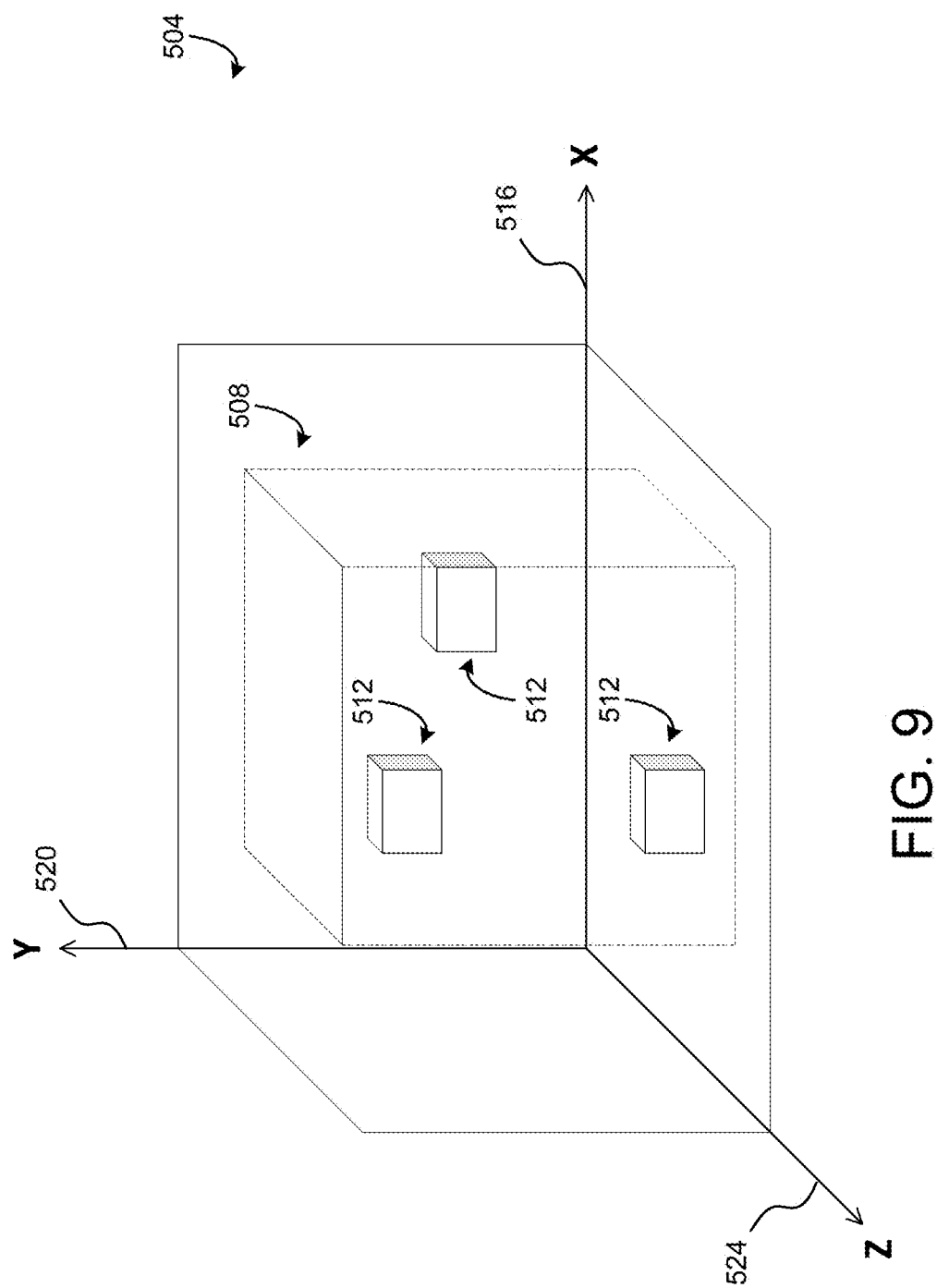
FIG. 9 shows a perspective view of a plurality of propulsion thrusters (of FIG. 2-5, FIG. 6, FIG. 7-8, or any combination thereof) positioned within a vehicle, in accordance with illustrative embodiments.

FIG. 9 shows a perspective view of a plurality of propulsion thrusters (of FIG. 2-5, FIG. 6, or FIG. 7-8, or any combination thereof) positioned within a vehicle, in accordance with illustrative embodiments. A system 504 comprises a vehicle 508 with thrusters 512 located in three-dimensional space as define by an x-axis 516, a y-axis 520, and a z-axis 520. The plurality of thrust generators 512 may be identical or similar to 204, 308, or 408 or any combination thereof. FIG. 9 depicts three thrust generators; however, vehicle 508 may contain any number of thrust generators 512 in any orientation. In various embodiments, vehicle 508 may be a vehicle designed for space travel, aquatic travel, land travel, aerial travel, etc. In various embodiments, each thrust generator 512 within vehicle 508 may be identical. In another embodiment, each thrust generator 512 may be different. In further embodiments, vehicle 508 may contain a plurality of thrust generators 512, some of which are similar/identical and some which different. In various embodiments, the thrust generators 512 may be close to each other or distant from each other. A subset of thrust generators 512 may be clustered while others are spaced farther apart. The thrust generators 512 may be controlled by one or more controllers. In certain embodiments each thrust generator 512 may be controlled by an individual controller (identical or similar to 120). In other embodiments, every thrust generator 512 in vehicle 508 may be controlled by the same controller. In various embodiments, each thrust generator 512 may have an individual power source, or multiple thrust generators 512 may share an energy source (similar or identical to 116). In further embodiments, the energy source may be a battery, a generator, an engine etc. that is powered by solar energy, hydrogen energy, additional batteries, nuclear energy, etc. Batteries can be charged using any method deemed suitable for the application.

Figure 10:
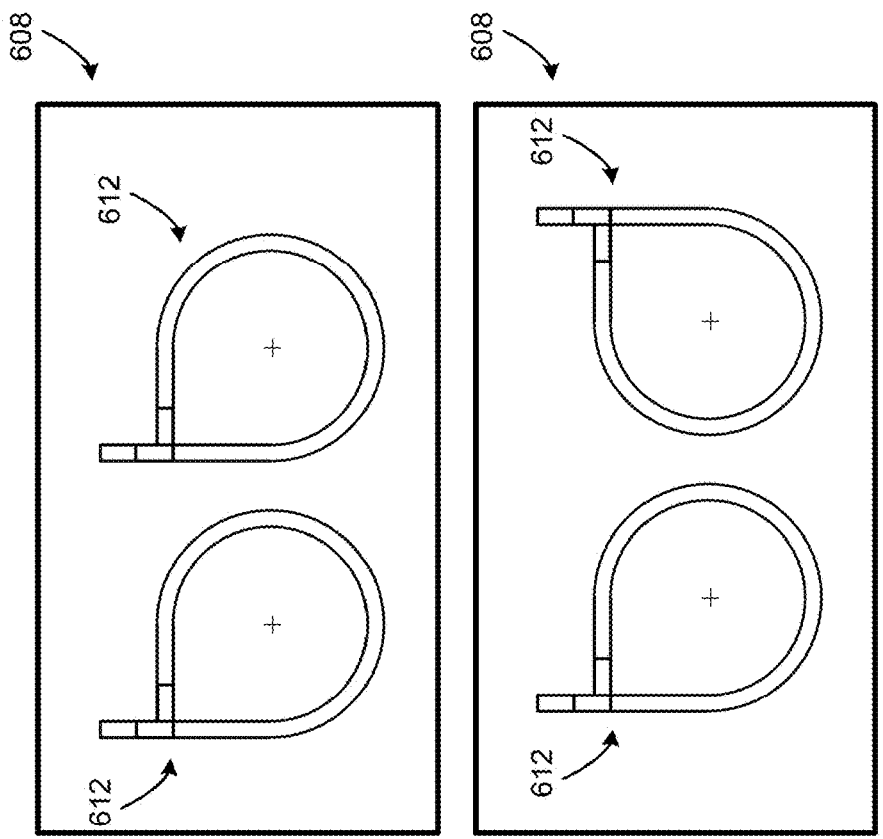
FIG. 10 shows top views of possible configurations for a propulsion thruster, in accordance with illustrative embodiments.
Figure 10:
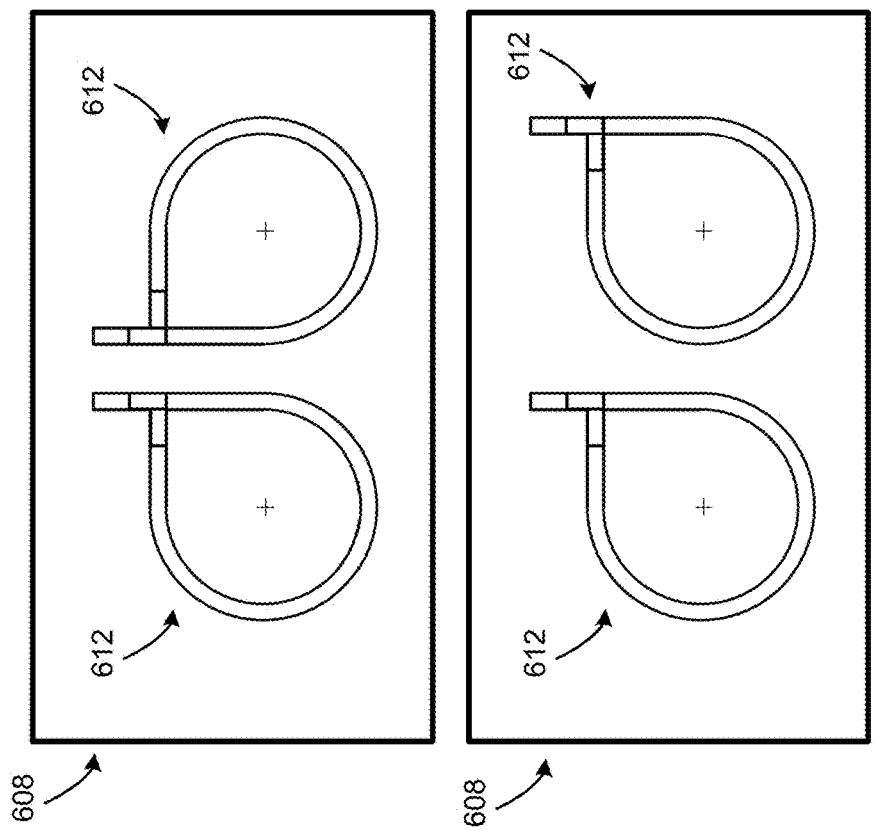

FIG. 10 shows top views of possible configurations for a propulsion thruster, the same or similar to 204 (FIGS. 2-5). Each propulsion thruster 608 is shown to contain two thrust generator units 612, but may be include additional thruster units above or below the units shown. As shown in FIG. 10, units 612 may be oriented and arranged such that the combination of circular and linear portions of each unit are in identical (e.g., as in the top-right and bottom-left frames of FIG. 10) or mirrored configuration (e.g., as in the top-left and bottom-right frames of FIG. 10), in various embodiments. In further embodiments, the linear portions of each unit 612 may be positioned close in proximity (e.g., as in the top-left frame of FIG. 10). In additional embodiments, the linear portions in each unit 612 may be positioned more distally (e.g., as in the bottom-right frame of FIG. 10). In some embodiments, the circular and linear portions of each unit may be neither in identical nor in mirrored configurations. In certain embodiments, each propulsion thruster 608 may contain fewer than or more than two thrust generator units 612. In various embodiments, different pairs of thruster units may be combined as desired in various configurations and arrangements. For example, the pair of units in the version in the top-right frame of FIG. 10 may be combined with the pair of units in the version in the bottom-left frame of FIG. 10, with one pair placed just above or below the other. Any number units or pairs of units may be combined in any arrangement and orientation deemed suitable for various implementations.

Figure 11B:
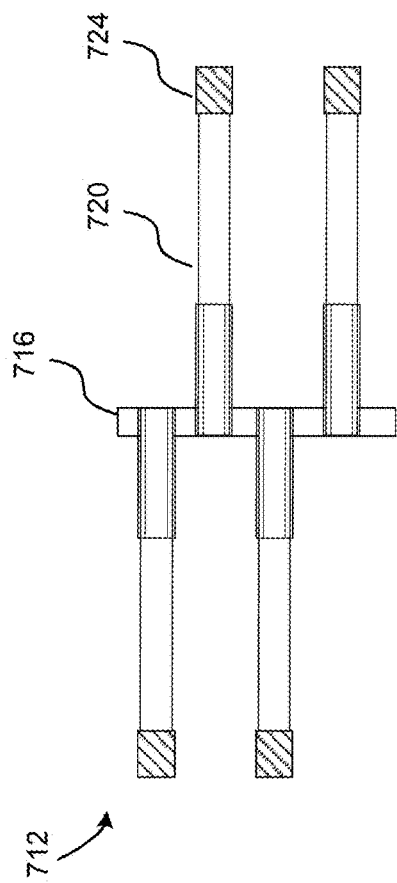
FIG. 11B shows a side view of a propulsion thruster, in accordance with illustrative embodiments.
Figure 11A:
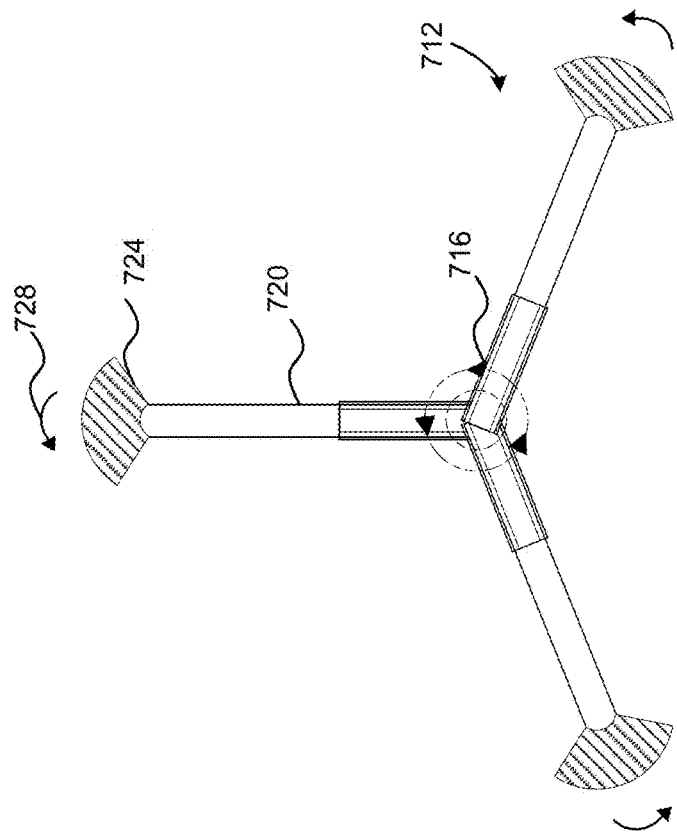
FIG. 11A shows a top view of a propulsion thruster, in accordance with illustrative embodiments.

FIG. 11A and FIG. 11B depict a top and side view, respectively, of a possible configuration for a propulsion thruster unit, similar to 308. In various embodiments, propulsion thruster unit 712 may contain a single actuator 716 which drives telescopic arms 720, each attached to a mass 724. Each telescopic arm may be positioned a vertical distance from the other telescopic arm(s) such that all arms are aligned and connected to actuator 716 along a single axis. Alternatively, all (or a subset of) telescopic arms may be fixed to the actuator 716 along a single axis and in one plane, which facilitates operation of all (or the subset) in one plane. Each telescopic arm 720 may move in direction 728, moving each mass 724 along a trajectory similar to 424, which may include a circular portion and a deviated portion. In various embodiments, all telescopic arms may be fixed to actuator 716 along a single axis in the same plane. FIGS. 11A and 11B depict unit 712 as having three and four telescopic arms, respectively. In certain embodiments, unit 712 may comprise any number of arms which may be less than or greater than three. In various embodiments, telescopic arms 720 may or may not move in synchrony. In other embodiments, telescopic arms 720 may be configured to move at the same speeds. In other embodiments, telescopic arms 720 may be configured to move at different speeds. In some embodiments, masses 724 may be the same in size and shape. In other embodiments, masses 724 may be the same in size but different in shape. In further embodiments, masses 724 may be different in size but the same or equivalent in shape. In additional embodiments, masses 724 may be different in both size and shape. In some embodiments, telescopic arms may be connected to actuator 716 in a proximal arrangement. In other embodiments, telescopic arms may be distally arranged along actuator 716. In various embodiments, each telescopic arm may extend and retract through deviated trajectories simultaneously or telescopic arms may independently extend and retract thereby moving through deviated trajectories at different times. In certain embodiments, all telescopic arms 720 attached to actuator 716 are the same in length. In other embodiments, some or all telescopic arms 720 are different in length.

In certain embodiments, a propulsion thruster may contain a single thrust unit 712. In other embodiments, a propulsion thruster may contain any number of thrust units 712, in any arrangement and orientation deemed suitable for various implementations.

References herein to the positions of elements (e.g., "top," "bottom," "above," "below") and directions (e.g., "forward," "rearward," "leftward," "rightward," "upward," "downward") are merely used to indicate relative positions and directions and/or to describe the orientation of various elements in the figures. It should be noted that the orientation of various elements may differ according to other exemplary embodiments, and that such variations are intended to be encompassed by the present disclosure. In all provided figures, depictions are not necessarily to scale and all dimensions can be changed as deemed suitable. For example, the deviation may be smaller (not as far out from center) or larger (farther out from center), the degree to which the arm may extend and retract may be greater or smaller, the size, shape, and density of the mass may be modified, etc.

As used herein, "actuators" may include any devices capable of being used to move a component of a system in a controlled or controllable manner, and may use hydraulic (e.g., linear, torque), electric (e.g., motor), magnetic, pneumatic (e.g., linear, torque), manual (e.g., levers, gears, wheels), spring, sling shot, and/or other mechanisms deemed suitable.

The disclosure may be further defined by reference to the following example embodiments:

Embodiment A

A propulsion system, comprising: first and second thruster units each having a movable mass; one or more mechanical actuators that rotate each mass along a trajectory that deviates from a circular trajectory such that each thruster unit generates a forward momentum and a non-forward momentum; wherein the first thruster unit is positioned with respect to the second thruster unit in the propulsion system such that the forward momentums of the first and second thruster units are additive and the non-forward momentums of the first and second thruster units are at least partially neutralized.

Embodiment B

The propulsion system of Embodiment A, wherein each thruster unit is configured to generate the forward momentum at a first segment of the trajectory of the corresponding mass, and to generate the non-forward momentum at a second segment of the trajectory of the corresponding mass.

Embodiment C

The propulsion system of Embodiment A or B, further comprising a controller configured to control the one or more actuators to set rotational speed for one or both of the masses of the first and second thruster units.

Embodiment D

The propulsion system of any of Embodiments A-C, wherein the controller is configured to change rotational speeds of the masses to change magnitudes of the forward momentums.

Embodiment E

The propulsion system of any of Embodiments A-D, wherein each thruster unit comprises a rotating arm secured to the corresponding mass, and wherein the rotating arm is configured to change its length as it rotates.

Embodiment F

The propulsion system of any of Embodiments A-E, wherein the rotating arm has a first length at a circular segment of the trajectory, and a second length that is greater than the first length at a deviating segment of the trajectory.

Embodiment G

The propulsion system of any of Embodiments A-F, wherein each of the first and second thruster units further comprises a track within which the corresponding masses move, wherein each thruster unit reciprocates the mass within the corresponding track using the one or more mechanical actuators.

Embodiment H

The propulsion system of any of Embodiments A-G, wherein each thruster unit is configured to generate the forward momentum via collision of the mass at a first end region of the track, and to generate the non-forward momentum via collision of the mass at a second end region of the track.

Embodiment I

The propulsion system of any of Embodiments A-H, further comprising one or more sensors and a controller that is configured to determine rotational speed of the masses of the first and second units based on data from the one or more sensors, and that is further configured to control the one or more mechanical actuators to increase or decrease rotational speeds.

Embodiment J

The propulsion system of any of Embodiments A-I, further comprising one or more sensors and a controller that is configured to determine positions of the masses of the first and second thruster units based on data from the one or more sensors, and that is further configured to control the one or more mechanical actuators to change relative positions of the masses in corresponding trajectories.

Embodiment K

The propulsion system of any of Embodiments A-J, wherein the first and second thruster units are configured such that the masses rotate in a same spatial plane.

Embodiment L

The propulsion system of any of Embodiments A-K, wherein the first and second thruster units are configured to be tiltable such that the masses are rotatable in variable planes.

Embodiment M

The propulsion system of any of Embodiments A-L, wherein the system is a closed system of converting rotational momentum into linear propulsion.

Embodiment N

The propulsion system of any of Embodiments A-M, wherein two linear propulsions are generated per rotation.

Embodiment O

A propulsion system, comprising: first and second thruster units each having a closed track and one or more actuators configured to move a mass within the track, wherein each track includes a circular segment and a deviating segment such that each thruster unit generates a forward momentum and a non-forward momentum as the mass moves through the track; wherein the first and second thruster units have a mirroring configuration such that the forward momentums of the first and second thruster units are additive and the non-forward momentums of the first and second units are at least partially neutralized.

Embodiment P

The propulsion system of Embodiment O, wherein the one or more actuators of each thruster unit are situated at terminal ends of the track and are configured to reciprocate the mass between the terminal ends.

Embodiment Q

The propulsion system of Embodiment O or P, wherein the first and second thruster units are situated such that the masses move within a same spatial plane.

Embodiment R

The propulsion system of any of Embodiments O-Q, wherein the first and second thruster units move the corresponding mass from a first end region to a second end region of the corresponding track in a first cycle and from the second end region to the first end region in a second cycle, and wherein the system further comprises a controller configured to control the one or more actuators to set timing for the first and second cycles.

Embodiment S

A method of propulsion, comprising: moving a first mass of a first thruster unit along a first trajectory that includes a first circular segment and a first deviating segment to generate a first forward momentum and a first non-forward momentum as the first mass rotates; and simultaneously moving a second mass of a second thruster unit along a second trajectory that includes a second circular segment and a second deviating segment to generate a second forward momentum and a second non-forward momentum as the second mass rotates, wherein the second thruster unit is positioned with respect to the first thruster unit such that the first and second forward momentums are additive and at least one of the first and second non-forward momentums is at least partially neutralized by the other of the first and second non-forward momentums.

Embodiment T

The method of Embodiment S, wherein the first mass is rotated at a first rotation speed and the second mass is rotated at a second rotation speed, wherein the first forward momentum has a first forward magnitude and the second forward momentum has a second forward magnitude, and wherein the method further comprises changing one or both of the first and second rotation speeds to change one or both of the first and second forward momentums.

Embodiment U

The method of Embodiment S or T, wherein moving the first mass along the first trajectory comprises changing a first length of a first telescopic arm of the first thruster unit to change a first radius of the first mass as the first mass rotates, and wherein moving the second mass along the second trajectory comprises changing a second length of a second telescopic arm of the second thruster unit to change a second radius of the second mass as the second mass rotates.

Embodiment V

The method of any of Embodiments S-U, wherein the first and second thruster units are mirroring thruster units such that the first and second trajectories substantially mirror each other, and wherein the first and second masses are rotated synchronously along the first and second trajectories, respectively.

Embodiment W

The method of any of Embodiments S-V, wherein the first and second thruster units comprise first and second tracks within which the first and second masses, respectively, are moved, wherein moving the first mass comprises reciprocating the first mass within the first track using a first set of mechanical actuators, and wherein moving the second mass comprises reciprocating the second mass within the second track using a second set of mechanical actuators.

Embodiment X

A propulsion system, comprising: first and second mirroring thruster units each having a movable mass and a mechanical actuator having a telescopic arm that changes length as it rotates the mass along a trajectory that includes a first segment having a first radius and a second segment having a second radius; wherein the first thruster unit is positioned with respect to the second thruster unit such that forward momentums generated in the first segments of the first and second thruster units are additive and non-forward momentums of the first and second thruster units are at least partially neutralized.

Embodiment Y

The propulsion system of Embodiment X, further comprising a controller configured to control the mechanical actuators of the first and second thruster units to set rotational speeds for the rotating masses to control magnitudes of the forward momentums.

Embodiment Z

The propulsion system of Embodiment X or Y, further comprising a controller configured to control arm lengths of the first and second thruster units to modify mass trajectories.

Embodiment AA

A propulsion system, comprising: a thruster having a movable mass and a mechanical actuator having a telescopic arm that changes length as the movable arm rotates so as to move the mass along a trajectory that includes a first segment and a second segment; wherein the first segment substantially follows a circular path and the second segment deviates from the circular path, and wherein deviation from the circular path generates a momentum to propel the thruster in a direction.

Embodiment BB

The propulsion system of Embodiment AA, wherein the thruster is configured to be tiltable such that the mass is rotatable in variable planes.

Embodiment CC

A method of propulsion, comprising controlling a mechanical actuator of a thruster to rotate a mass along a trajectory that includes a first segment and a second segment, wherein the first segment substantially follows a circular path and the second segment deviates from the circular path, and wherein deviation from the circular path generates a momentum to propel the thruster in a direction.

Embodiment DD

The method of Embodiment CC, further comprising rotating the mass in variable planes to propel the thruster in variable directions.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As utilized herein, the terms "approximately," "about," "substantially" and similar terms are intended to have a broad meaning in harmony with the common and accepted usage by those of ordinary skill in the art to which the subject matter of this disclosure pertains. In various embodiments, such terms may allow for 5% deviation. In various embodiments, such terms may allow for a 10% deviation. In various embodiments, such terms may allow for another deviation in harmony with the common and accepted usage by those of ordinary skill in the art to which the corresponding values apply.

It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

Advantageously, various embodiments of the disclosure may be, wholly or in part, "closed" in the sense that the expulsion of materials need not serve as the basis for propulsion, such as by using rocket fuel as propellant. The term "closed" may be applied to various embodiments of the entire system or to portions/components thereof. For example, thrust generator 112 may be "closed" and/or vehicle 108 may be "closed."

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

What is claimed is:

1. A propulsion system, comprising:
    first and second thruster units each having a movable mass, each of the first and second thruster units comprising a rotating telescopic arm secured to the corresponding mass, wherein the rotating telescopic arm is configured to change its length as it rotates;
    one or more mechanical actuators that rotate each mass along a trajectory that deviates from a circular trajectory such that each thruster unit generates a forward momentum and a non-forward momentum;
    wherein the first thruster unit is positioned with respect to the second thruster unit in the propulsion system such that the forward momentums of the first and second thruster units are additive and the non-forward momentums of the first and second thruster units are at least partially neutralized.

2. The propulsion system of claim 1, wherein each thruster unit is configured to generate the forward momentum at a first segment of the trajectory of the corresponding mass, and to generate the non-forward momentum at a second segment of the trajectory of the corresponding mass.

3. The propulsion system of claim 1, further comprising one or more sensors and a controller that is configured to determine rotational speed of the masses of the first and second units based on data from the one or more sensors, and that is further configured to control the one or more mechanical actuators to increase or decrease rotational speeds.

4. The propulsion system of claim 1, further comprising one or more sensors and a controller that is configured to determine positions of the masses of the first and second thruster units based on data from the one or more sensors, and that is further configured to control the one or more mechanical actuators to change relative positions of the masses in corresponding trajectories.

5. The propulsion system of claim 1, wherein the first and second thruster units are configured such that the masses rotate in a same spatial plane.

6. The propulsion system of claim 1, wherein the first and second thruster units are configured to be tiltable such that the masses are rotatable in variable planes.

7. The propulsion system of claim 1, wherein the system is a closed system of converting rotational momentum into linear propulsion.

8. The propulsion system of claim 1, wherein two linear propulsions are generated per rotation.

9. The propulsion system of claim 1, further comprising a controller configured to control the one or more actuators to set rotational speed for one or both of the masses of the first and second thruster units.

10. The propulsion system of claim 9, wherein the controller is configured to change rotational speeds of the masses to change magnitudes of the forward momentums.

11. The propulsion system of claim 1, wherein the rotating telescopic arm is configured to change its length via at least one of a hydraulic system, a pneumatic system, or a lead screw.

12. The propulsion system of claim 11, wherein the rotating arm has a first length at a circular segment of the trajectory, and a second length that is greater than the first length at a deviating segment of the trajectory.

13. The propulsion system of claim 1, wherein each of the first and second thruster units further comprises a track within which the corresponding masses move, wherein each thruster unit reciprocates the mass within the corresponding track using the one or more mechanical actuators.

14. The propulsion system of claim 13, wherein each thruster unit is configured to generate the forward momentum via collision of the mass at a first end region of the track, and to generate the non-forward momentum via collision of the mass at a second end region of the track.

* * * * *